(12) United States Patent
Yamamoto

(10) Patent No.: US 8,037,774 B2
(45) Date of Patent: *Oct. 18, 2011

(54) STATE DETECTION DEVICE

(75) Inventor: Tomoshige Yamamoto, Tokyo (JP)

(73) Assignee: Yamatake Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/874,603

(22) Filed: Sep. 2, 2010

(65) Prior Publication Data

US 2011/0056306 A1 Mar. 10, 2011

(30) Foreign Application Priority Data

Sep. 4, 2009 (JP) ................... 2009-204516

(51) Int. Cl.
*G01F 1/58* (2006.01)

(52) U.S. Cl. .................................. 73/861.12
(58) Field of Classification Search .............. 73/861.12, 73/861.16; 702/45
See application file for complete search history.

(56) References Cited

U.S. PATENT DOCUMENTS 7,434,478 B2 * 10/2008 Yamamoto ................. 73/861.12

FOREIGN PATENT DOCUMENTS

JP 3164684 B2 5/2001
JP 2006-90794 A 4/2006

* cited by examiner

*Primary Examiner* — Jewel V Thompson
(74) *Attorney, Agent, or Firm* — Ditthavong Mori & Steiner; Toshikatsu Imaizumi

(57) ABSTRACT

A state detection device which detects parameters includes a measuring pipe, electrodes, an exciting coil that applies a magnetic field to the fluid, signal lines arranged at angle to the magnetic field such that an electromotive force is generated due to a change with passage of time in the magnetic field, and a state quantifying unit for extracting a ∂A/∂t component from resultant electromotive forces that are detected at the electrodes and the signal lines and are composed of an electromotive force of the ∂A/∂t component irrelevant to a flow velocity of the fluid and resulting from a change with passage of time in the magnetic field and an electromotive force of a v×B component relevant to the flow velocity of the fluid, and extracts a variation factor relevant to the parameter from the ∂A/∂t component to quantify the parameter based on the variation factor.

15 Claims, 23 Drawing Sheets

STATE DETECTION DEVICE

CROSS-REFERENCES TO RELATED APPLICATION

This application claims priority from Japanese Patent Application Serial No. 2009-204516 filed Sep. 4, 2009, the contents of which are incorporated herein by reference in its entirety.

TECHNICAL FIELD

The present invention relates to a state detection device that detects a property or state of fluid, a state of magnetic field, or a state of a measuring pipe.

BACKGROUND

Measuring a flow rate of a fluid using a flowmeter is typically accompanied by needs for detection of a property or state of the measured fluid or a state of the fluid flowing through a measuring pipe. For example, in manufacture lines where chemicals are introduced into fluid, properties of the fluid such as conductivity and permittivity are measured, in addition to the flow rate thereof. In measuring pipes where contaminant is likely to adhere to the inner surface thereof, the adhesion state is measured to determine a maintenance cycle. Thus, there is a demand for measuring a property or state of fluid or a state of the pipe where the fluid flows as well as a flow rate thereof. In addition, there is a demand for realizing these measurements using a hardware configuration that is essentially the same as a flowmeter.

In other words, there is a demand for a single meter capable of selecting measurement of a flow rate of fluid, measurement of a state of the fluid, simultaneous measurement of a flow rate and state of the fluid, as desired by a user. The demand for simultaneous measurement of a flow rate and state of fluid means that the meter should be able to measure a property or state of the fluid independently of the flow rate of the fluid.

An electromagnetic flowmeter as an exemplary flowmeter is required to measure a state of a measuring pipe, in addition to the above needs, in terms of self-checking ability of the electromagnetic flowmeter. For example, in an electromagnetic flowmeter that uses an electrode to extract potential, insulating materials adhere to the electrode that is in contact with fluid, which precludes adequate extraction of the potential from the electrode and accurate measurement of a flow rate of the fluid. In this case, if the flowmeter can determine the cause of change in signals to be a change in flow rate of fluid therein or adhesion of insulating materials thereto, without interrupting measurement of the signals, troubles related to measured values can be prevented. In an electromagnetic flowmeter, usually, a change in a magnetic field to be applied results in errors in measured values. In this case, if the flowmeter has information about magnetic field applied to fluid, the flowmeter can determine the cause of the obtained abnormal output to be a change in flow rate of fluid or a change in the magnetic field applied to the fluid, providing the electromagnetic flowmeter with a self-checking function as the flowmeter.

As described above, it is desired to fulfill the requirements for measure various parameters other than flow rate in a hardware configuration that is essentially the same with that of a flowmeter. Examples of the devices that measure various parameters other than flow rate to fulfill the requirements are discussed in Japanese Patent No. 3164684 and Japan Measuring Instruments Federation, "A to Z of Flow Rate Measurement for Instrumentation Engineers", Kogyogijutsusha, 1995, pp. 147-148. The flowmeter devices disclosed in Japanese Patent No. 3164684 and Japan Measuring Instruments Federation, "A to Z of Flow Rate Measurement for Instrumentation Engineers", measure a level and a conductivity using the principle of electromagnetic flowmeter. The flowmeter devices calculate a level using a ratio between the electromotive force signals obtained from electrodes when exciting coils that are located opposite to each other around a measuring pipe are simultaneously driven and the electromotive force signals obtained from electrodes when one of the exciting coils is driven. The flowmeter devices also calculate a conductivity of fluid using a ratio between electromotive force signals before and after a change of an input impedance of a preamplifier connected to electrodes. This configuration can be used to detect substance adhesion.

Unfortunately, the electromagnetic flowmeters discussed in Japanese Patent No. 3164684 and Japan Measuring Instruments Federation, "A to Z of Flow Rate Measurement for Instrumentation Engineers", detects a property or state of fluid based on a ratio between flow rate signals, resulting in a problem that the flow rate decreasing to zero results in a larger measurement error and lower accuracy, and no property or state can be detected at a flow rate of zero. In addition, no change in magnetic field can be detected because the cause of change in measured flow rate cannot be determined whether a change in the flow rate itself or a change in magnetic field.

To address the above problems, the inventor of the present invention proposed a state detection device as illustrated in FIG. 29 (see Japanese Patent No. 2006-90794). The state detection device includes: a measuring pipe 1 through which a measured fluid flows for measurement; a pair of electrodes 2a and 2b that are disposed perpendicular to both a magnetic field applied to the measured fluid and an axis PAX of the measuring pipe 1, and mutually opposite across the measuring pipe to be in contact with the measured fluid, so as to detect an electromotive force generated by the magnetic field and the measured fluid; an exciting coil 3 that applies, to the measured fluid, a time-changing magnetic field asymmetrical to a boundary plane PLN that is perpendicular to the axis PAX in the measuring pipe, the electrodes 2a and 2b being placed on the plane PLN; a state quantifying unit that extracts a $\partial A/\partial t$ component from resultant electromotive forces that are detected by the electrodes 2a and 2b and composed of an electromotive force of a $\partial A/\partial t$ component irrelevant to a flow velocity of the fluid and an electromotive force of a v×B component resulting from the flow velocity of the fluid, extracts a variation factor relevant to a parameter (such as a property or state of the fluid or a state in the measuring pipe) from the $\partial A/\partial t$ component to quantify the parameter based on the variation factor; and a power source 9 that supplies excitation current to the exciting coil 3.

The state quantifying unit 8 includes: a signal converting unit 5 that extracts a $\partial A/\partial t$ component from resultant electromotive forces that are detected by the electrodes 2a and 2b and composed of an electromotive force of the $\partial A/\partial t$ component and an electromotive force of a v×B component, and then extracts a variation factor relevant to a parameter from the $\partial A/\partial t$ components; a state storing unit 6 that stores, in advance, a relationship between the variation factor relevant to the parameter and the parameter; and a state outputting unit 7 that outputs the parameter corresponding to the extracted variation factor based on the relationship stored in the state storing unit 6. According to the state detection device discussed in Japanese Patent Application Publication No. 2006-90794, accurate detection of a state in a measuring pipe including a fluid and a magnetic field can be achieved independently of a flow velocity of a fluid.

SUMMARY

As described above, the electromagnetic flowmeters discussed in Japanese Patent No. 3164684 and Japan Measuring Instruments Federation, "A to Z of Flow Rate Measurement for Instrumentation Engineers", have problems: a flow rate decreasing to zero results in a larger measurement error and lower accuracy, and no property or state of fluid can be detected at a flow rate of zero; and no change in a magnetic field can be detected.

The state detection device discussed in Japanese Patent Application Publication No. 2006-90794 requires an application of a magnetic field to fluid asymmetrical to the boundary plane PLN in the measuring pipe in FIG. 29. Accordingly, unlike to a typical electromagnetic flowmeter, electrodes need to be offset from coils in the state detection device. For this reason, a detector in a typical electromagnetic flowmeter cannot be used in the state detection device, which requires a separate design and fabrication of a detector unit.

The present invention was made in view of the above problems, and is directed to provide a state detection device that uses the basic configuration of a conventional typical detector of an electromagnetic flowmeter and is capable to precisely detect a state of fluid and a magnetic field in a measuring pipe independently of a flow rate of the fluid.

The present invention provides a state detection device that detects parameters such as a property or state of a fluid, a state of a magnetic field, or a state in a measuring pipe. The state detection device includes: a measuring pipe through which a fluid flows; at least one electrode in the measuring pipe that detects an electromotive force generated by a magnetic field applied to the fluid and flow of the fluid; an exciting unit including the electrode that applies a time-changing magnetic field symmetrical to an axial plane of the electrode that is perpendicular to an axis of the measuring pipe; at least one signal line that is connected to the electrode at one end thereof at an angle to the magnetic field that is parallel to the axial plane of the electrode, such that an electromotive force is generated by a change with passage of time in the magnetic field; and a state quantifying unit that is connected to the other end of the signal line to extract a $\partial A/\partial t$ component from resultant electromotive forces that are detected at the electrode and the signal line and are composed of an electromotive force of the $\partial A/\partial t$ component irrelevant to a flow velocity of the fluid and resulting from a change with passage of time in the magnetic field and an electromotive force of a v×B component relevant to the flow velocity of the fluid, and extracts a variation factor relevant to the parameter from the $\partial A/\partial t$ component to quantify the parameter based on the variation factor.

A state detection device of one configuration according to the present invention includes: the state quantifying unit includes: a signal converting unit that extracts a $\partial A/\partial t$ component from resultant electromotive forces that are detected at the electrode and the signal line and are composed of an electromotive force of the $\partial A/\partial t$ component irrelevant to a flow velocity of the fluid and resulting from a change with passage of time in the magnetic field and an electromotive force of a v×B component relevant to the flow velocity of the fluid, and extracts a variation factor from the $\partial A/\partial t$ component relevant to the parameter; a state storing unit that stores, in advance, the relationship between the variation factor relevant to the parameter and the parameter; and a state outputting unit that outputs the parameter corresponding to the extracted variation factor, based on the relationship stored in the state storing unit. In one configuration of the state detection device of the present invention, the signal line has a portion extending in the same direction as the axial direction of the measuring pipe.

In one configuration of the state detection device of the present invention, the exciting unit includes: an exciting coil having an axis lying in the axial plane of the electrode; and a power source supplying an excitation current to the exciting coil, and the signal converting unit extracts the $\partial A/\partial t$ component based on a phase difference or time difference between the resultant electromotive forces and the excitation current. In one configuration (a first embodiment) of the state detection device of the present invention, the power source supplies an excitation current of a first frequency to the exciting coil, and the signal converting unit extracts the $\partial A/\partial t$ component based on a phase difference between a component of the first frequency in the resultant electromotive forces and the excitation current, and extracts a value or phase of a variation factor relevant to the parameter from the $\partial A/\partial t$ component, and the state storing unit stores in advance the relationship between the value or phase of the variation factor relevant to the parameter and the parameter.

In one configuration of the state detection device of the present invention, the exciting unit includes: an exciting coil having an axis lying in the axial plane of the electrode; and a power source supplying excitation currents to the exciting coil, the currents yielding a plurality of exciting frequencies simultaneously or alternatively, and the signal converting unit extracts the $\partial A/\partial t$ component based on amplitudes and phases of at least two frequency components that are obtained simultaneously or alternatively from the resultant electromotive forces. In one configuration (a second embodiment) of the state detection device of the present invention, the power source supplies excitation currents to the exciting coil, the currents yielding first and second exciting frequencies simultaneously or alternatively, and the signal converting unit obtains amplitudes and phases of two components at the first and second frequencies from the resultant electromotive forces, extracts the electromotive force difference between the first and second frequency components as the $\partial A/\partial t$ component to extract a value or phase of a variation factor relevant to the parameter from the $\partial A/\partial t$ component, and the state storing unit stores in advance the relationship between the value or phase of the variation factor relevant to the parameter and the parameter. In one configuration (a first or second embodiment) of the state detection device of the present invention, the at least one electrode comprises a pair of electrodes disposed opposite to each other across the axis of the measuring pipe and along an axis perpendicular to the axis of the measuring pipe, and the at least one signal line comprises two signal lines connected to the electrodes respectively, at least one of the two signal lines being arranged at an angle to a magnetic field that is parallel to the axial plane of the electrodes such that a change with passage of time in the magnetic field generates an electromotive force.

In one configuration of the state detection device of the present invention, the exciting unit includes: an exciting coil having an axis lying in the axial plane of the electrode; and a power source supplying an excitation current to the exciting coil, and the at least one signal line comprises a plurality of signal lines arranged in different directions from one another, and the signal converting unit extracts the $\partial A/\partial t$ component based on the sum or difference between the resultant electromotive forces obtained from the plurality of signal lines. In one configuration (a third embodiment) of a state detection device of the present invention, the at least one electrode comprises a pair of electrodes disposed opposite to each other across the axis of the measuring pipe and along an axis perpendicular to the axis of the measuring pipe, and the at least one signal line comprises two signal lines that are connected to the electrodes respectively and disposed in the opposite directions from each other from the axial plane of the electrodes, and the signal converting unit extracts the ∂A/∂t component based on the sum of the resultant electromotive forces obtained from the two signal lines and extracts a value or phase of a variation factor relevant to the parameter from the ∂A/∂t component, and the state storing unit stores in advance the relationship between the value or phase of the variation factor relevant to the parameter and the parameter.

In one configuration of the state detection device of the present invention, the exciting unit includes: the exciting coil having an axis lying in the axial plane of the electrode; and a power source supplying an excitation current to the exciting coil, and the at least one signal line comprises a plurality of signal lines connected to the same electrode, and the signal converting unit extracts the ∂A/∂t component based on an amplitude and phase of the resultant electromotive forces obtained from the at least two signal lines among the resultant electromotive forces obtained from the plurality of signal lines. In one configuration (a fourth embodiment) of the state detection device of the present invention, the at least one signal line comprises first and second signal lines connected to the same electrode and disposed in the opposite directions from each other from the axial plane of the electrode, and the signal converting unit calculates an amplitude and a phase of a first resultant electromotive force obtained from the first signal line and an amplitude and a phase of a second resultant electromotive force obtained from the second signal line and extracts an electromotive force difference between the first and second resultant electromotive forces as the ∂A/∂t component based on the amplitudes and phases to extract a value or phase of a variation factor relevant to the parameter from the ∂A/∂t component, and the state storing unit stores in advance the relationship between the value or phase of the variation factor relevant to the parameter and the parameter. In one configuration of the state detection device of the present invention, the at least one electrode comprises a pair of electrodes disposed opposite to each other across the axis of the measuring pipe and along an axis perpendicular to the axis of the measuring pipe, the at least one signal line comprises a plurality of signal lines connected to each of the electrodes, the signal lines connected to at least one of the electrodes being arranged at an angle to a magnetic field that is parallel to the axial plane of the electrodes such that a change with passage of time in the magnetic field generates an electromotive force.

One configuration (a fifth embodiment) of the state detection device of the present invention further includes an outer core that covers the exciting unit, and the at least one signal line is arranged inside of the outer core at an angle to a magnetic field that is parallel to the axial plane of the electrode such that a change with passage of time in the magnetic field generates an electromotive force. One configuration (a fifth embodiment) of the state detection device of the present invention further includes an outer core that covers the exciting coil, and the at least one signal line is arranged inside of the outer core at an angle to a magnetic field that is parallel to the axial plane of the electrode such that a change with passage of time in the magnetic field generates an electromotive force.

ADVANTAGEOUS EFFECTS OF INVENTION

A state detection device according to the present invention includes: a measuring pipe through which a fluid flows; at least one electrode in the measuring pipe that detects an electromotive force generated by a magnetic field applied to the fluid and flow of the fluid; an exciting unit including the electrode that applies a time-changing magnetic field symmetrical to an axial plane of the electrode that is perpendicular to an axis of the measuring pipe; at least one signal line that is connected to the electrode at one end thereof at an angle to the magnetic field that is parallel to the axial plane of the electrode, such that an electromotive force is generated by a change with passage of time in the magnetic field; and a state quantifying unit that is connected to the other end of the signal line to extract a ∂A/∂t component from resultant electromotive forces that are detected at the electrode and the signal line and are composed of an electromotive force of the ∂A/∂t component irrelevant to a flow velocity of the fluid and resulting from a change with passage of time in the magnetic field and an electromotive force of a v×B component relevant to the flow velocity of the fluid, and extracts a variation factor relevant to the parameter from the ∂A/∂t component to quantify the parameter based on the variation factor. Such a structure enables accurate detection of a property or state of the fluid, a state of the magnetic field, or states of the measuring pipe. The present invention uses a measuring pipe, an electrode, and an exciting unit included in a detector of a conventional typical electromagnetic flowmeter, and includes a signal line that is arranged such that an electromotive force is generated by a change with passage of time in a magnetic field. As a result, the states of the measuring pipe including the magnetic field and the fluid can be detected, and the effect that has been obtained only by a state detection device using asymmetrical excitation can be realized by a detector in a typical electromagnetic flowmeter without significant change in its structure.

The present invention uses an outer core, and at least one signal line is arranged inside of the outer core to efficiently detect a ∂A/∂t component.

BRIEF DESCRIPTION OF THE DRAWINGS

Other features and advantages of the present state detection device will be apparent from the ensuing description, taken in conjunction with the accompanying drawings, in which.

DESCRIPTION

Physical Phenomena and Basic Mathematical Knowledge

Figure 1:
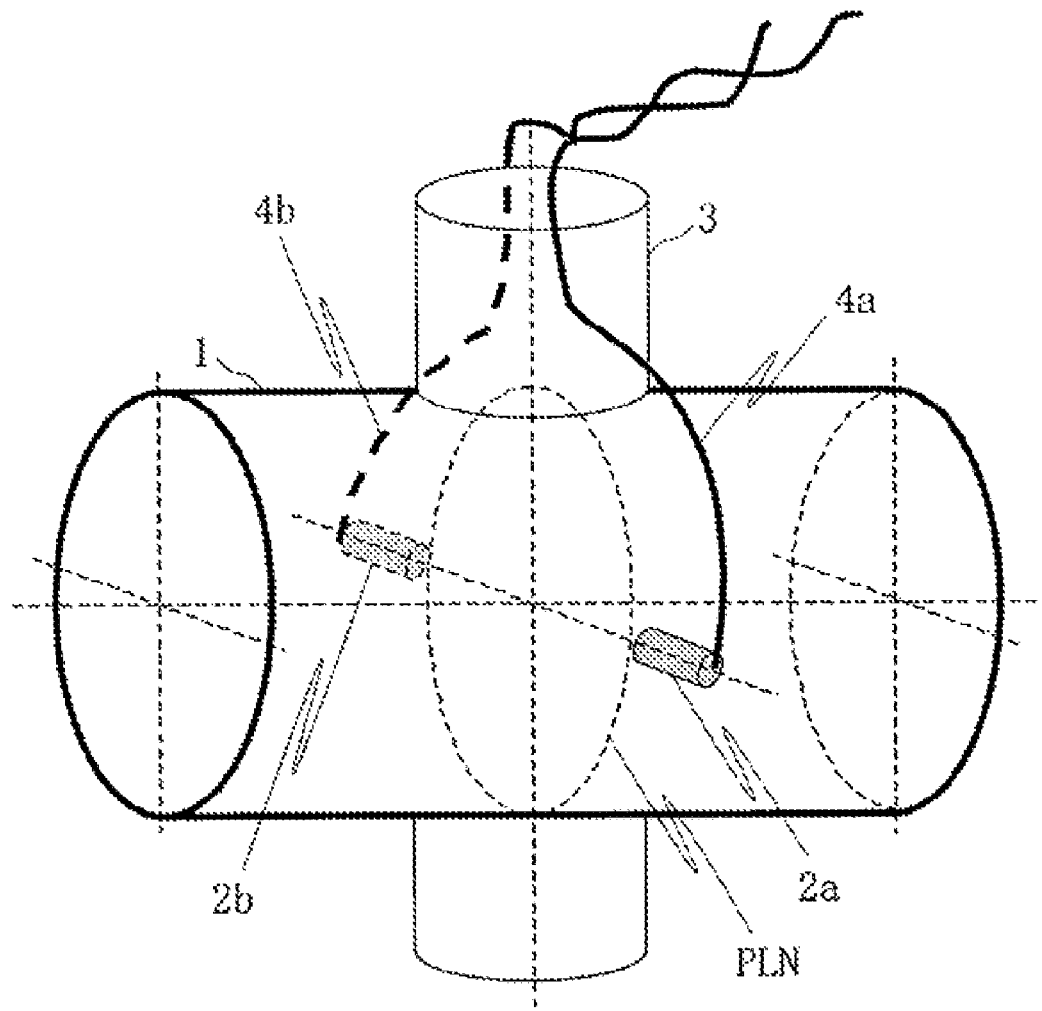
FIG. 1 illustrates a signal line in a conventional typical electromagnetic flowmeter.

For better understanding of the prior art and the present invention, a basic theoretical premise will be described below. First, a physical phenomenon is described to explain the prior art. When an object moves in a time-changing magnetic field, electromagnetic induction generates two types of electric fields: (a) an electromotive force $E^{(i)}=-\partial A/\partial t$ which is generated by a change with passage of time in the magnetic field, and (b) an electromotive force $E^{(v)}=v \times B$ which is generated as the object moves in the magnetic field, where $v \times B$ represents a cross product of v and B, and $\partial A/\partial t$ represents a partial differential of A with respect to time. The alphabets v, B, an A are vectors having directions in three dimensions (x, y, and z), and respectively correspond to v: flow rate, B: magnetic flux density, and A: vector potential (whose relationship with magnetic flux density is expressed by B=rotA). Note that these three dimensional vectors differ from vectors on a complex plane which will be described later. Any electromotive force when generated is detected through fluid, electrode, and signal line.

In contrast, an eddy current is generated in a fluid by a $\partial A/\partial t$ component irrelevant to a flow velocity of the fluid. Because the flow path and current density of the eddy current changes depending on the state in a measuring pipe containing magnetic field and fluid and an input impedance generated when a potential is extracted, the change in flow path and current density can be extracted as a potential which provides a measurement of a property or state of the fluid other than flow velocity.

Next, well-known basic mathematical knowledge is described. A cosine wave $P \cdot \cos(\omega \cdot t)$ and a sine wave $Q \cdot \sin(w \cdot t)$ both having the same frequency but different amplitudes are combined into the following cosine wave.

$$P \cdot \cos(\omega \cdot t) + Q \cdot \sin(\omega \cdot t) = (P^2+Q^2)^{1/2} \cdot \cos(\omega \cdot t - \epsilon) \quad (1)$$

where $\epsilon=\tan^{-1}(Q/P)$, P and Q are amplitudes, and ω is angular frequency.

The combination in Equation (1) can be conveniently analyzed by transforming the equation into a complex coordinate plane with a real axis for the amplitude P of cosine wave $P \cdot \cos(\omega \cdot t)$ and an imaginary axis for the amplitude Q of sine wave $Q \cdot \sin(\omega \cdot t)$. According to the complex coordinate plane, a distance $(P^2+Q^2)^{1/2}$ from the origin gives an amplitude of the combined wave, and an angle $\epsilon=\tan^{-1}(Q/P)$ with respect to the real axis gives a phase difference between the combined wave and a value ω·t.

The following functional relation holds true on the complex coordinate plane.

$$L \cdot \exp(j \cdot \epsilon) = L \cdot \cos(\epsilon) + j \cdot L \cdot \sin(\epsilon) \quad (2)$$

Equation (2) expresses a complex vector, where j is an imaginary unit, L represents a length of a complex vector, and ε represents a direction of the complex vector. Accordingly, the transformation to complex vectors is useful to analyze the geometrical relationship on the complex coordinate plane.

Structural Mechanism of the Prior Art

The relationship between the physical phenomena and the structural mechanism of the prior art is now described. In the state detection device discussed in Japanese Patent Application Publication No. 2006-90794 that uses asymmetrical excitation, the axial plane of a coil is offset from the axial plane of an electrode, which differs from the configuration of a detector in a typical electromagnetic flowmeter. In addition, a detector in a typical electromagnetic flowmeter is configured not to detect a $\partial A/\partial t$ component as much as possible. Specifically, in the detector, the magnetic field is symmetrical to the plane PLN perpendicular to the axial direction of the measuring pipe, the electrode being placed on the plane PLN, and also the signal lines 4a and 4b are arranged to minimize an area that interlinks with flux generated by the exciting coil 3 as illustrated in FIG. 1. This structure prevents generation of $\partial A/\partial t$ component in the signal lines 4a and 4b.

Focused Point of the Present Invention

The present invention focused on the fact that a conventional typical detector having an exciting coil and an electrode arranged in a common plane can be changed such that a signal line is interlinked with a magnetic field, and thereby a ∂A/∂t component is generated in the signal line or the electrode, which enables the detection of a state of the measuring pipe containing magnetic field and fluid.

Basic Principle of the Present Invention

The above described two electromotive forces: $E^{(i)}=-\partial A/\partial t$; and $E^{(v)}=v \times B$ are generated in a fluid. In the typical detector with a magnetic field symmetrical to a plane PLN, an electromotive force $E^{(i)}=-\partial A/\partial t$, which is generated by a change with passage of time in the magnetic field, becomes zero due to the symmetry at the electrode. In contrast, the arrangement of a signal line interlinked with magnetic flux causes an electromotive force to be generated in the electrode and the signal line due to a change with passage of time in the magnetic field. The electromotive force that passes through the signal line to be detected by a signal converting unit eventually results in resultant electromotive forces including a v×B component in the fluid and ∂A/∂t component in the electrode and the signal line.

Hereinafter, the transformation to a complex coordinate plane and the geometrical analysis using complex vectors are used to describe the behaviors of generated electromotive forces and the approach the present invention adopts to use the behaviors.

First Structure

Figure 2:
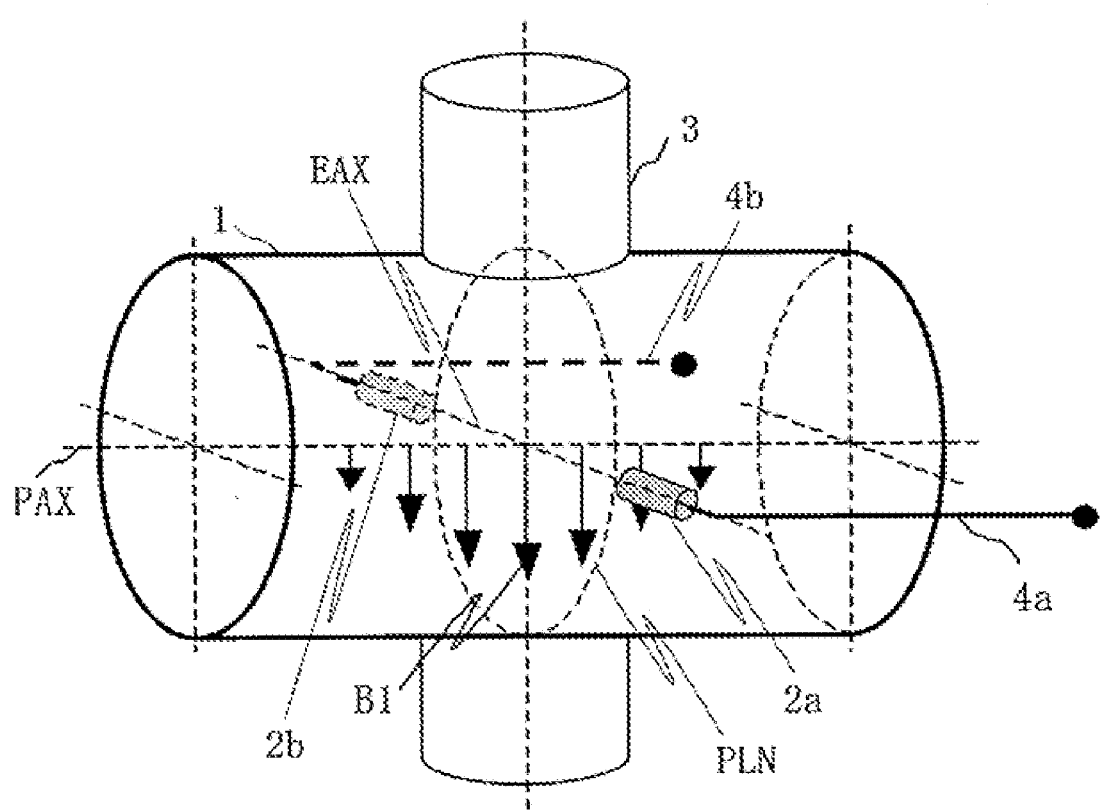
FIG. 2 is a block diagram illustrating a principle of a first configuration of a state detection device of the present invention.

A first structure of a state detection device according to the present invention is now described. FIG. 2 is a block diagram illustrating the principle of the first structure. The state detection device in FIG. 2 includes a measuring pipe 1 through which a measured fluid flows, a pair of electrodes 2a and 2b that are disposed perpendicular to both a magnetic field applied to the measured fluid and an axis PAX of the measuring pipe 1, and mutually opposite across the measuring pipe to be in contact with the measured fluid, so as to detect electromotive forces generated by the magnetic field and the measured fluid; an exciting coil 3 that applies, to the measured fluid, a time-changing magnetic field asymmetrical to a boundary plane PLN that is perpendicular to the axis PAX in the measuring pipe, the electrodes 2a and 2b being placed on the plane PLN; and signal lines 4a and 4b arranged to interlink with a flux generated by the exciting coil 3 and connect the electrodes 2a and 2b to a signal converting unit (not illustrated). In the first structure, both of the signal lines 4a and 4b are disposed on the same side with respect to the plane PLN where the electrodes 2a and 2b lie.

Second Structure

Figure 3:
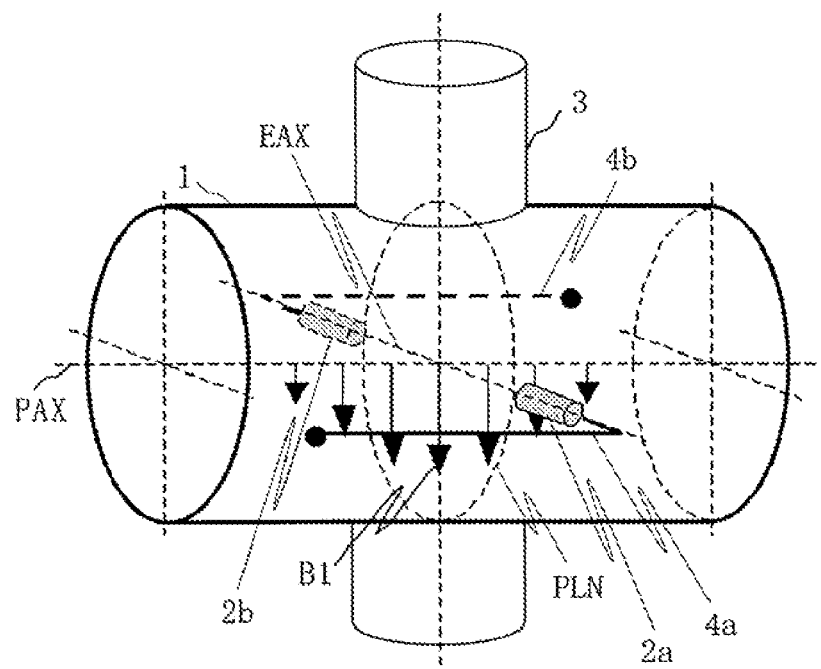
FIG. 3 is a block diagram illustrating a principle of a second configuration of a state detection device of the present invention.

A second structure of a state detection device according to the present invention is now described. FIG. 3 is a block diagram illustrating the principle of the second structure. In the second structure, a signal line 4a is disposed on the different side from that of a signal line 4b with respect to a plane PLN where the electrodes 2a and 2b lie, and is approximately rotationally symmetric to a signal line 4b around the axis of an exciting coil 3.

Third Structure

Figure 4:
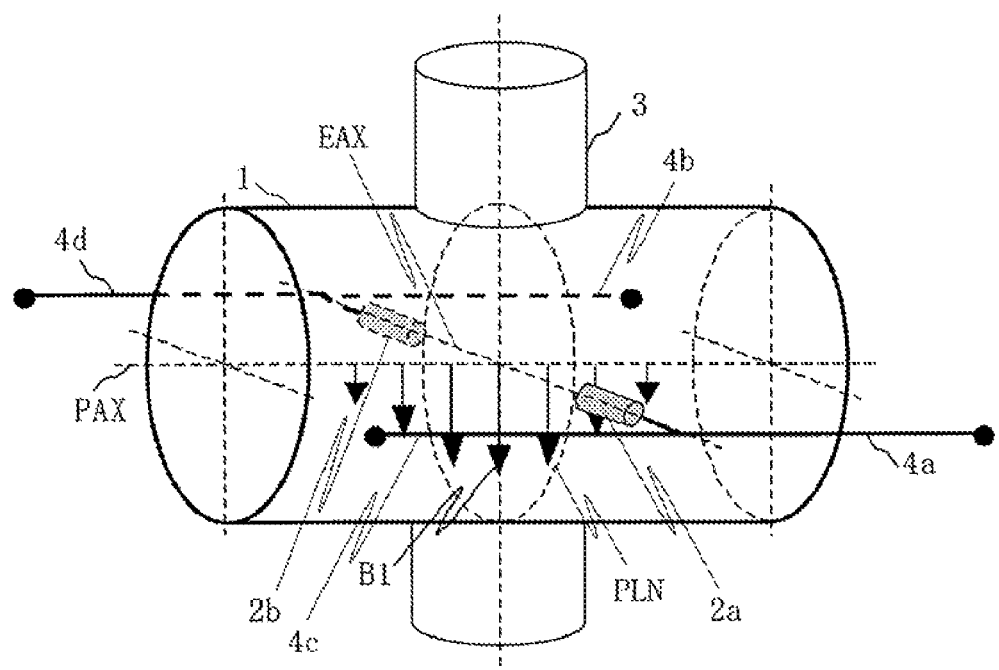
FIG. 4 is a block diagram illustrating a principle of a third configuration of a state detection device of the present invention.

A third structure of a state detection device according to the present invention is now described. FIG. 4 is a block diagram illustrating the principle of the third structure. In the third structure, a first signal line 4a and a second signal line 4c are connected to a single electrode 2a, and the first signal line 4a is disposed on the different side from that of the second signal line 4c with respect to the plane PLN where the electrodes 2a and 2b lie. Similarly, a first signal line 4b and a second signal line 4d are connected to a single electrode 2b, and the first signal line 4b is disposed on the different side from that of the second signal line 4d with respect to the plane PLN where the electrodes 2a and 2b lie. The first signal lines 4a and 4b are located approximately symmetric to the second signal line 4c and 4d.

In the first to third structures, a magnetic field component (magnetic flux density) B1 that is perpendicular to both of an electrode axis EAX and a pipe axis PAX on the electrode axis EAX that extends between the electrodes 2a and 2b, among the magnetic field components generated by the exciting coil 3 is given by the following equation.

$$B1 = b1 \cdot \cos(\omega 0 \cdot t - \theta 1) \tag{3}$$

where b1 is amplitude of magnetic flux density B1, ω0 is angular frequency, and θ1 is phase difference (phase delay) between magnetic flux density B1 and ω0·t. Hereinafter, the magnetic flux density B1 is referred to as magnetic field B1.

Electromotive Force Resulting from Change in Magnetic Field

An electromotive force generated in the first to third structures is now described, the force being generated due to a change in a magnetic field irrelevant to a flow velocity of a measured fluid. An electromotive force due to a change in magnetic field depends on a time derivative of the magnetic field, and thereby a magnetic field B1 generated from the exciting coil 3 can be differentiated as follows.

$$dB1/dt = -\omega 0 \cdot b1 \cdot \sin(\omega 0 \cdot t - \theta 1) \tag{4}$$

Figure 5:
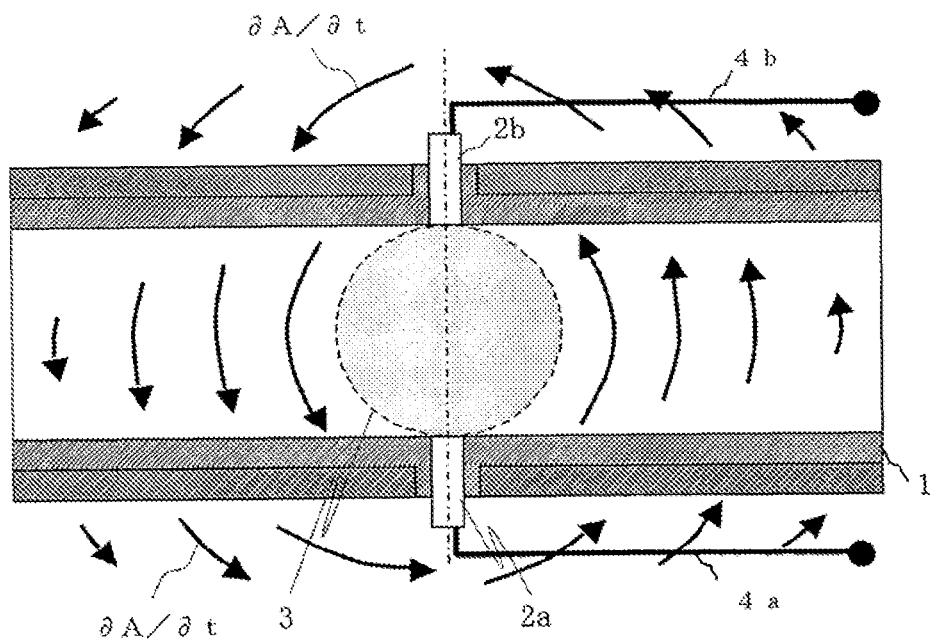
FIG. 5 illustrates distribution of ∂A/∂t components in the first configuration of a state detection device of the present invention, as seen from above.
Figure 6:
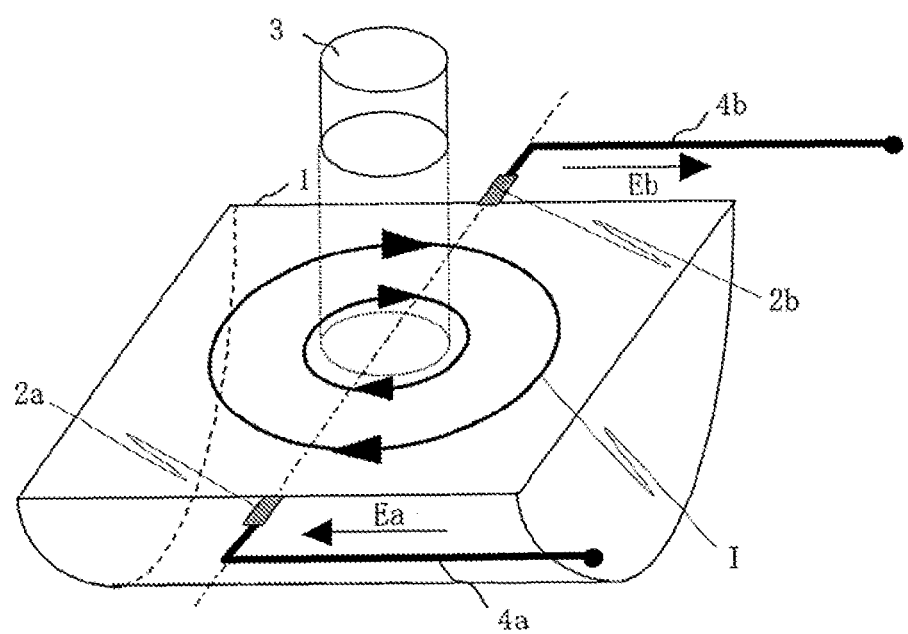
FIG. 6 illustrates eddy currents and electromotive forces when the flow rate of a measured fluid is zero in the first configuration of a structured document of the present invention.

When the flow velocity of the measured fluid is zero, the electromotive force resulting from the magnetic field B1 is only composed of the component generated by a change in the magnetic field B1. In this case, with the signal lines arranged in the first structure as illustrated in FIG. 2, the ∂A/∂t components are distributed, when seen from above, as illustrated in FIG. 5, and electromotive forces Ea and Eb are generated as illustrated in FIG. 6. Accordingly, in the plane including the electrode axis EAX and the pipe axis PAX, the electromotive force generated in the fluid between the electrodes due to a change in the magnetic field B1 becomes zero, whereas the electromotive forces Ea and Eb are generated in the signal lines 4a and 4b, respectively, due to the change in the magnetic field B1. The mark I in FIG. 6 represents an eddy current due to a change in the magnetic field B1.

When the direction from the end of each signal line to the connected electrode is defined as negative, the electromotive force Eb in the signal line 4b is obtained as follows, by multiplying a time derivative −dB1/dt of a magnetic field by a coefficient kb (i.e, a complex number depending on the positions of the electrode 2b and the signal line 4b) with the direction of the magnetic field being taken into consideration.

$$Eb = kb \cdot \omega 0 \cdot b1 \cdot \sin(\omega 0 \cdot t - \theta 1) \tag{5}$$

Equation (5) can be rewritten as follows.

$$\begin{aligned} Eb &= kb \cdot \omega 0 \cdot b1 \cdot \{\sin(-\theta 1)\} \cdot \cos(\omega 0 \cdot t) + \\ & \quad kb \cdot \omega 0 \cdot b1 \cdot \{\cos(-\theta 1)\} \cdot \sin(\omega 0 \cdot t) \\ &= kb \cdot \omega 0 \cdot b1 \cdot \{-\sin(\theta 1)\} \cdot \cos(\omega 0 \cdot t) + \\ & \quad kb \cdot \omega 0 \cdot b1 \cdot \{\cos(\theta 1)\} \cdot \sin(\omega 0 \cdot t) \end{aligned} \tag{6}$$

When Equation (6) is mapped to a complex coordinate plane relative to ω0·t, a real axis component Ex and an imaginary axis component Ey are given by the following equations respectively.

$$Ebx = kb \cdot \omega 0 \cdot b1 \cdot \{-\sin(\theta 1)\} \quad (7)$$
$$= kb \cdot \omega 0 \cdot b1 \cdot \{\cos(\pi/2 + \theta 1)\}$$
$$Eby = kb \cdot \omega 0 \cdot b1 \cdot \{\cos(\theta 1)\} \quad (8)$$
$$= kb \cdot \omega 0 \cdot b1 \cdot \{\sin(\pi/2 + \theta 1)\}$$

Then, the values Ebx and Eby in Equation (7) and Equation (8) are converted into a complex vector Ebc.

$$Ebc = Ebx + j \cdot Eby \quad (9)$$
$$= kb \cdot \omega 0 \cdot b1 \cdot \{\cos(\pi/2 + \theta 1)\} +$$
$$j \cdot kb \cdot \omega 0 \cdot b1 \cdot \{\sin(\pi/2 + \theta 1)\}$$
$$= kb \cdot \omega 0 \cdot b1 \cdot \{\cos(\pi/2 + \theta 1) + j \cdot \sin(\pi/2 + \theta 1)\}$$
$$= kb \cdot \omega 0 \cdot b1 \cdot \exp\{j \cdot (\pi/2 + \theta 1)\}$$

The coefficient kb can be converted into a complex vector as follows.

$$kb = rkb \cdot \cos(\theta b) + j \cdot rkb \cdot \sin(\theta b) \quad (10)$$
$$= rkb \cdot \exp(j \cdot \theta b)$$

where rkb is proportional coefficient, θb is angle of the vector kb with respect to the real axis.

By substituting Equation (10) to Equation (9), an electromotive force Ebc (an electromotive force only resulting from a change in the magnetic field B1) that is a complex vector transformed from the electromotive force Eb in the signal line 4b is obtained as follows.

$$Ebc = rkb \cdot \exp(j \cdot \theta b) \cdot \omega 0 \cdot b1 \cdot \exp\{j \cdot (\pi/2 + \theta 1)\} \quad (11)$$
$$= rkb \cdot \omega 0 \cdot b1 \cdot \exp\{j \cdot (\pi/2 + \theta 1 + \theta b)\}$$

Similarly, an electromotive force Ea generated in the signal line 4a is obtained by multiplying a time derivative dB1/dt of a magnetic field B1, which is in the opposite direction, by a coefficient ka (i.e, a complex number depending on the positions of the electrode 2a and the signal line 4a) with the direction of the magnetic field B1 being taken into consideration. The coefficient ka can be transformed into a complex vector as follows.

$$ka = rka \cdot \exp(j \cdot \theta a) \quad (12)$$

where rka is a proportional coefficient, θa is angle of the vector ka with respect to the real axis.

With reference to Equation (11), Equation (12) can be used as follows to obtain an electromotive force Eac (an electromotive force only resulting from a change in the magnetic field B1) that is a complex vector transformed from the electromotive force Ea in the signal line 4a.

$$Eac = -rka \cdot \omega 0 \cdot b1 \cdot \exp\{j \cdot (\pi/2 + \theta 1 + \theta a)\} \quad (13)$$

When the difference between electromotive forces at the ends of the signal line 4a and 4b that are only generated by a change with passage of time in the magnetic field B1 is defined as a value Ecd, the electromotive force difference Ecd is a difference between the electromotive forces Ebc and Eac, which is expressed by the following equation.

$$Ecd = Ebc - Eac \quad (14)$$
$$= rkb \cdot \omega 0 \cdot b1 \cdot \exp\{j \cdot (\pi/2 + \theta 1 + \theta b)\} +$$
$$rka \cdot \omega 0 \cdot b1 \cdot \exp\{j \cdot (\pi/2 + \theta 1 + \theta a)\}$$
$$= \{rkb \cdot \exp(j \cdot \theta b) + rka \cdot \exp(j \cdot \theta a)\} \cdot \omega 0 \cdot b1 \cdot \exp\{j \cdot (\pi/2 + \theta 1)\}$$

When the sum between electromotive forces at the ends of the signal line 4a and 4b that are only generated by a change with passage of time in the magnetic field B1 is defined as a value Ecs, the electromotive force sum Ecs is expressed by the following equation.

$$Ecs = Ebc + Eac \quad (15)$$
$$= rkb \cdot \omega 0 \cdot b1 \cdot \exp\{j \cdot (\pi/2 + \theta 1 + \theta b)\} -$$
$$rka \cdot \omega 0 \cdot b1 \cdot \exp\{j \cdot (\pi/2 + \theta 1 + \theta a)\}$$
$$= \{rkb \cdot \exp(j \cdot \theta b) - rka \cdot \exp(j \cdot \theta a)\} \cdot \omega 0 \cdot b1 \cdot \exp\{j \cdot (\pi/2 + \theta 1)\}$$

For easier handling of equations, the sum of the two vectors: rkb·exp(j·θb) and rka·exp(j·θa) is converted to an expression: rks·exp(j·θs) as in Equation (16), whereas the difference between the two vectors: rkb·exp(j·θb) and rka·exp(j·θa) is converted to an expression: rkd·exp(j·θd) as in Equation (17).

$$rkb \cdot \exp(j \cdot \theta b) + rka \cdot \exp(j \cdot \theta a) = rks \cdot \exp(j \cdot \theta s) \quad (16)$$
$$rkb \cdot \exp(j \cdot \theta b) - rka \cdot \exp(j \cdot \theta a) = rkd \cdot \exp(j \cdot \theta d) \quad (17)$$

The electromotive force difference Ecd in Equation (14) is converted as in Equation (18) according to Equation (16), whereas the electromotive force sum Ecs is converted as in Equation (19) according to Equation (17).

$$Ecd = \{rkb \cdot \exp(j \cdot \theta b) + rka \cdot \exp(j \cdot \theta a)\} \cdot \omega 0 \cdot b1 \cdot \exp\{j \cdot (\pi/2 + \theta 1)\} \quad (18)$$
$$= rks \cdot \omega 0 \cdot b1 \cdot \exp\{j \cdot (\pi/2 + \theta 1 + \theta s)\}$$

$$Ecs = \{rkb \cdot \exp(j \cdot \theta b) - rka \cdot \exp(j \cdot \theta a)\} \cdot \omega 0 \cdot b1 \cdot \exp\{j \cdot (\pi/2 + \theta 1)\} \quad (19)$$
$$= rkd \cdot \omega 0 \cdot b1 \cdot \exp\{j \cdot (\pi/2 + \theta 1 + \theta d)\}$$

As described above, the electromotive force that only results from a change in the magnetic field B1 is obtained.

Figure 7:
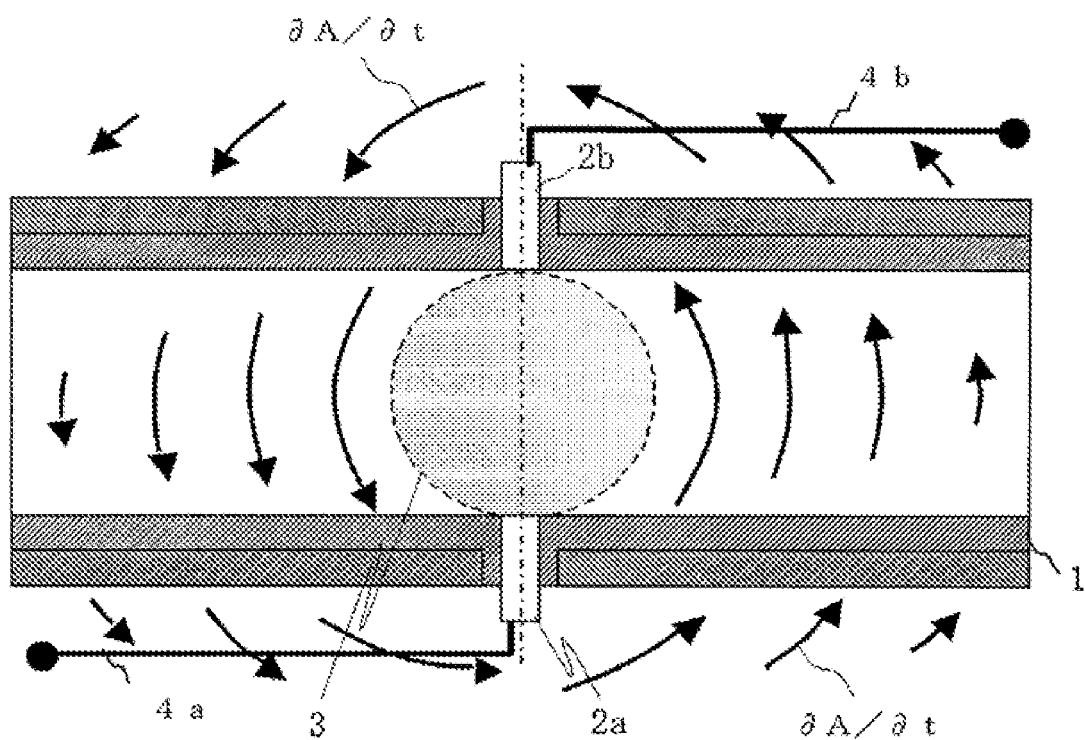
FIG. 7 illustrates distribution of ∂A/∂t components in the second configuration of a state detection device of the present invention, as seen from above.
Figure 8:
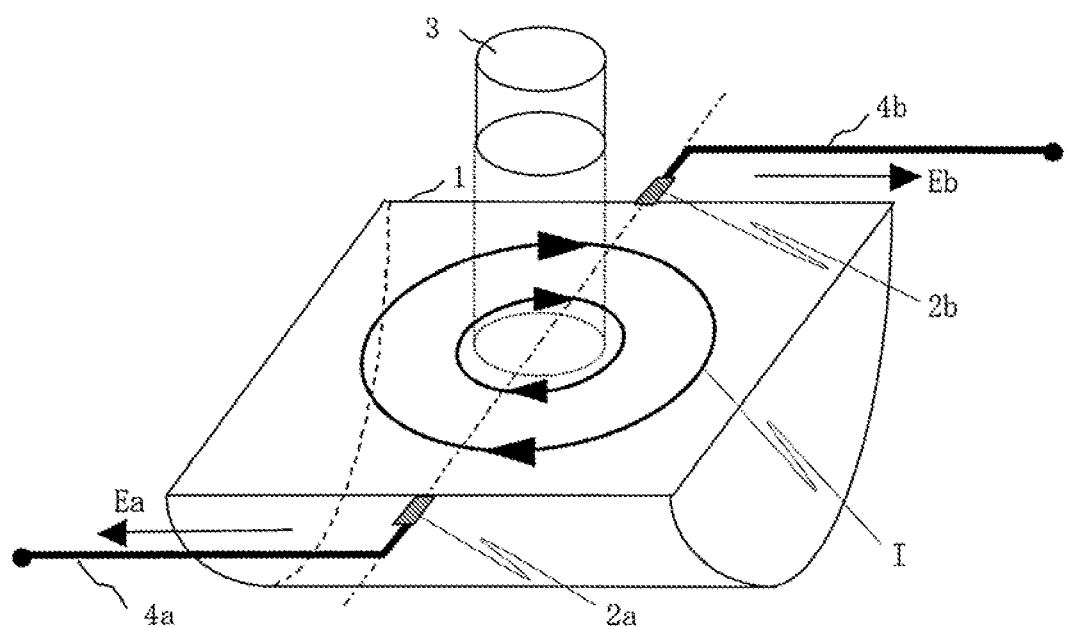
FIG. 8 illustrates eddy currents and electromotive forces when the flow rate of a measured fluid is zero in the second configuration of a structured document of the present invention.

The electromotive force that only results from a change in the magnetic field B1 in the second structure is now described. When the flow velocity of a measured fluid is zero, with the signal lines arranged in the second structure as illustrated in FIG. 3, ∂A/∂t components are distributed, when seen from above, as illustrated in FIG. 7, and electromotive forces Ea and Eb are generated in the signal lines 4a and 4b as illustrated in FIG. 8.

Thus, in the second structure, an electromotive force EacR that is a complex vector converted from the electromotive force Ea in the signal line 4a has a positive sign opposite to that of the electromotive force Eac in Equation (13). The electromotive force EacR is obtained according to the following equation.

$$EacR = rka \cdot \omega 0 \cdot b1 \cdot \exp\{j \cdot (\pi/2 + \theta 1 + \theta a)\} \quad (20)$$

When the difference between electromotive forces at the ends of the signal line 4a and 4b that are only generated by a change with passage of time in the magnetic field B1 is defined as a value EcdR, the electromotive force difference EcdR is expressed by the following equation as in Equation (14).

$$EcdR = Ebc - EacR \quad (21)$$
$$= rkb \cdot \omega 0 \cdot b1 \cdot \exp\{j \cdot (\pi/2 + \theta 1 + \theta b)\} -$$
$$rka \cdot \omega 0 \cdot b1 \cdot \exp\{j \cdot (\pi/2 + \theta 1 + \theta a)\}$$
$$= \{rkb \cdot \exp(j \cdot \theta b) - rka \cdot \exp(j \cdot \theta a)\} \cdot \omega 0 \cdot b1 \cdot \exp\{j \cdot (\pi/2 + \theta 1)\}$$

When the sum between electromotive forces at the ends of the signal line 4a and 4b that are only generated by a change with passage of time in the magnetic field B1 is defined as a value EcsR, the electromotive force sum EcsR is expressed by the following equation as in Equation (15).

$$EcsR = Ebc + EacR \quad (22)$$
$$= rkb \cdot \omega 0 \cdot b1 \cdot \exp\{j \cdot (\pi/2 + \theta 1 + \theta b)\} +$$
$$rka \cdot \omega 0 \cdot b1 \cdot \exp\{j \cdot (\pi/2 + \theta 1 + \theta a)\}$$
$$= \{rkb \cdot \exp(j \cdot \theta b) + rka \cdot \exp(j \cdot \theta a)\} \cdot \omega 0 \cdot b1 \cdot \exp\{j \cdot (\pi/2 + \theta 1)\}$$

As in the case with Equation (14) and Equation (15), for easier handling of equations, the electromotive force difference EcdR in Equation (21) according to Equation (17) is converted to that as in Equation (23), whereas the electromotive force sum EcsR in Equation (22) according to Equation (16) is converted to that as in Equation (24).

$$EcdR = \{rkb \cdot \exp(j \cdot \theta b) - rka \cdot \exp(j \cdot \theta a)\} \cdot \omega 0 \cdot b1 \cdot \exp\{j \cdot (\pi/2 + \theta 1)\} \quad (23)$$
$$= rkd \cdot \omega 0 \cdot b1 \cdot \exp\{j \cdot (\pi/2 + \theta 1 + \theta d)\}$$

$$EcsR = \{rkb \cdot \exp(j \cdot \theta b) + rka \cdot \exp(j \cdot \theta a)\} \cdot \omega 0 \cdot b1 \cdot \exp\{j \cdot (\pi/2 + \theta 1)\} \quad (24)$$
$$= rks \cdot \omega 0 \cdot b1 \cdot \exp\{j \cdot (\pi/2 + \theta 1 + \theta d)\}$$

As described above, the electromotive force that only results from a change in the magnetic field B1 in the second structure is obtained.

Figure 9:
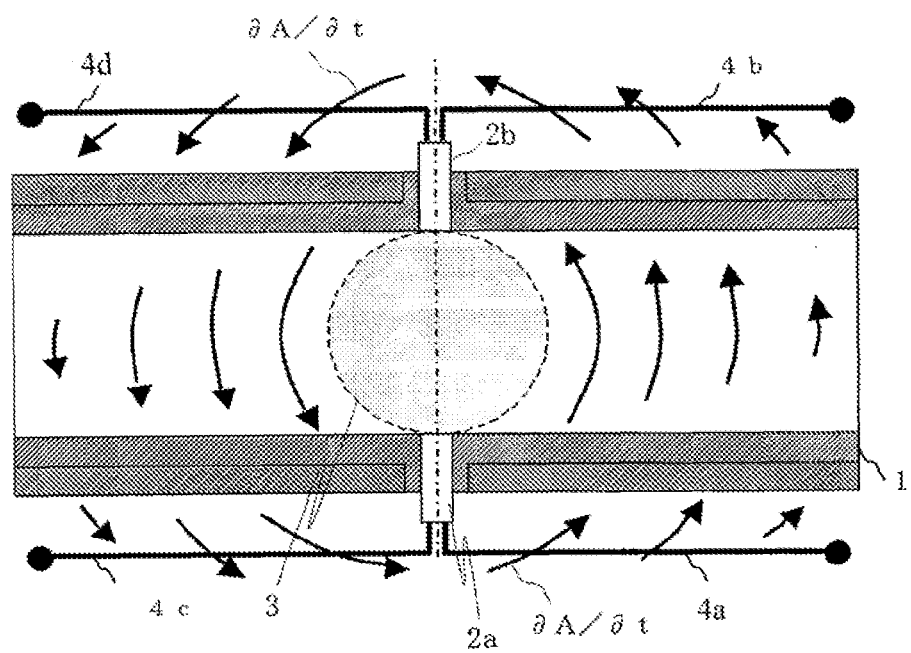
FIG. 9 illustrates distribution of ∂A/∂t components in the third configuration of a state detection device of the present invention, as seen from above.
Figure 10:
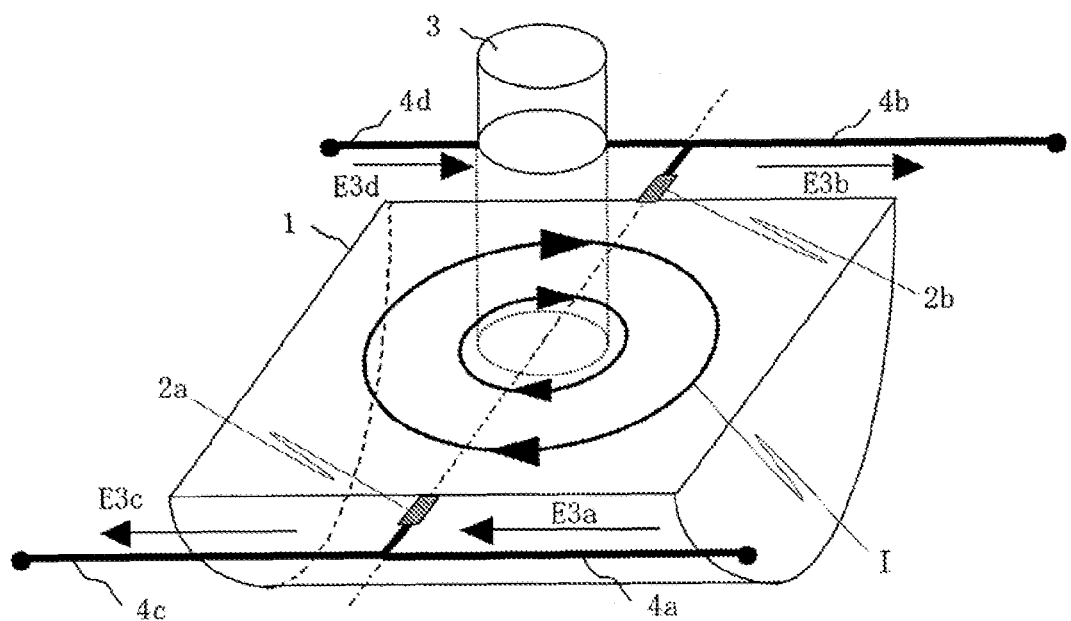
FIG. 10 illustrates eddy currents and electromotive forces when the flow rate of a measured fluid is zero in the third configuration of a structured document of the present invention.
Figure 11:
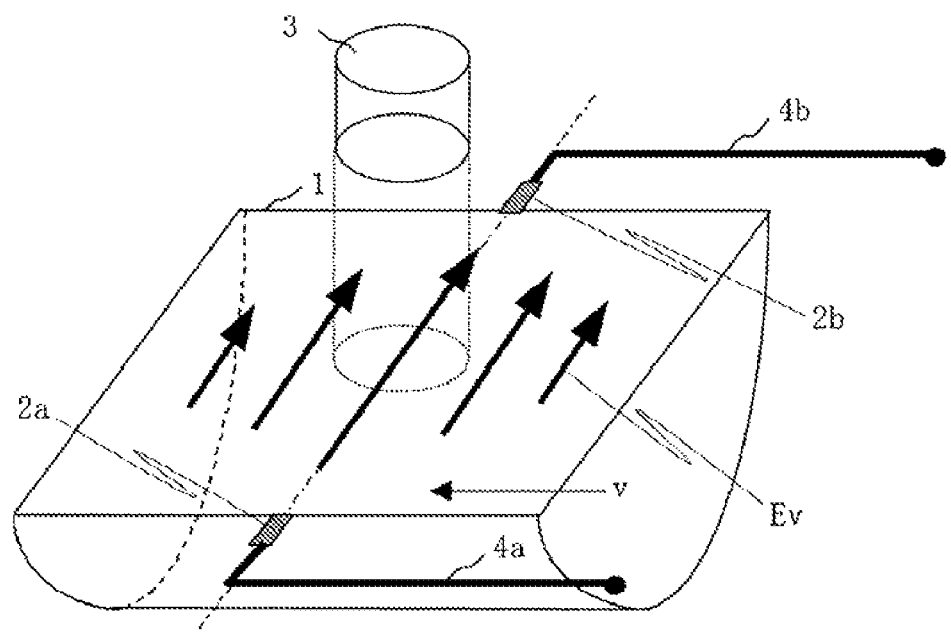
FIG. 11 illustrates electromotive forces between electrodes when the flow rate of a measured fluid is not zero in the first configuration of a structured document of the present invention.

The electromotive force that only results from a change in the magnetic field B1 in the third structure is now described. When the flow velocity of a measured fluid is zero, with the signal lines arranged in the third structure as illustrated in FIG. 4, ∂A/∂t components are distributed, when seen from above, as illustrated in FIG. 9, and electromotive forces E3a, E3b, E3c, and E3d are generated in the signal lines 4a, 4b, 4c, and 4d as illustrated in FIG. 10.

When the difference between electromotive forces at the ends of the signal line 4a and 4b that are only generated by a change with passage of time in the magnetic field B1 is defined as a value Ecd1, the electromotive force difference Ecd1 is expressed by Equation (18), as in the first structure. When rks is substituted for rks1, and θs for θs1 in Equation (18), the electromotive force difference Ecd1 is expressed by the following equation.

$$Ecd1 = rks1 \cdot \omega 0 \cdot b1 \cdot \exp\{j \cdot (\pi/2 + \theta 1 + \theta s1)\} \quad (25)$$

When the difference between electromotive forces at the ends of the signal line 4c and 4d that are only generated by a change with passage of time in the magnetic field B1 is defined as a value Ecd2, the electromotive force difference Ecd2 is expressed by the following equation, by substituting rks1 for rks2, and θs1 for θs2 in Equation (25).

$$Ecd2 = -rks2 \cdot \omega 0 \cdot b1 \cdot \exp\{j \cdot (\pi/2 + \theta 1 + \theta s2)\} \quad (26)$$

As described above, the electromotive force that only results from a change in the magnetic field B1 in the third structure is obtained.

Electromotive Force Resulting from Flow Velocity

Electromotive forces generated in signal lines in the first to third structures due to changes in flow velocity of a measured fluid and magnetic field B1 are now described. When the flow velocity of the flow velocity of a measured fluid is V (V≠0), in the first structure as illustrated in FIG. 2, a v×B1 component is generated due to a flow velocity vector v of the measured fluid in addition to the electromotive force at the flow velocity of zero. Specifically, the flow velocity vector v of the measured fluid and the magnetic field B1 generate an electromotive force Ev between the electrodes. Assume that the electromotive force Ev moves in a positive direction.

A line-to-line electromotive force that is detected at the ends of the signal lines 4a and 4b corresponds to an electrode-to-electrode electromotive force Ev detected at the electrodes 2a and 2b. The electrode-to-electrode electromotive force Ev is obtained by multiplying a value of magnetic field B1 by a flow velocity V and a coefficient kv (i.e., a complex number related to a conductivity and permittivity of a measured fluid and the structure of measuring pipe 1 having the electrodes 2a and 2b) as follows.

$$Ev = kv \cdot V \cdot \{b1 \cdot \cos(\omega 0 \cdot t - \theta 1)\} \quad (27)$$

Equation (27) can be rewritten as follows.

$$Ev = kv \cdot V \cdot b1 \cdot \cos(\omega 0 \cdot t) \cdot \cos(-\theta 1) - kv \cdot V \cdot b1 \cdot \sin(\omega 0 \cdot t) \cdot \sin(-\theta 1) \quad (28)$$
$$= kv \cdot V \cdot b1 \cdot \{\cos(\theta 1)\} \cdot \cos(\omega 0 \cdot t) + kv \cdot V \cdot b1 \cdot \{\sin(\theta 1)\} \cdot \sin(\omega 0 \cdot t)$$

When Equation (28) is mapped to a complex coordinate plane relative to ω0·t, a real axis component Evx and an imaginary axis component Evy can be expressed by the following equations, respectively.

$$Evx = kv \cdot V \cdot b1 \cdot \cos(\theta 1) \quad (29)$$

$$Evy = kv \cdot V \cdot b1 \cdot \sin(\theta 1) \quad (30)$$

The components Evx and Evy expressed by Equation (29) and Equation (30) are transformed into a complex vector Evc as follows.

$$Evc = Evx + j \cdot Evy \quad (31)$$
$$= kv \cdot V \cdot b1 \cdot \cos(\theta 1) + j \cdot kv \cdot V \cdot b1 \cdot \sin(\theta 1)$$
$$= kv \cdot V \cdot b1 \cdot \{\cos(\theta 1) + j \cdot \sin(\theta 1)\}$$
$$= kv \cdot V \cdot b1 \cdot \exp(j \cdot \theta 1)$$

The coefficient kv can be converted into a complex vector as follows.

$$kv = rkv \cdot \cos(\theta v) + j \cdot rkv \cdot \sin(\theta v) \quad (32)$$
$$= rkv \cdot \exp(j \cdot \theta v)$$

where rkv is proportional coefficient, and θv is angle of a vector kv with respect to the real axis.

By substitution of Equation (32) to Equation (31), an electrode-to-electrode electromotive force Evc that is a complex vector transformed from the electrode-to-electrode electromotive force Ev is obtained as follows.

$$Evc = kv \cdot V \cdot b1 \cdot \exp(j \cdot \theta 1) \quad (33)$$
$$= rkv \cdot V \cdot b1 \cdot \exp\{j \cdot (\theta 1 + \theta v)\}$$

Equation (33) represents the difference between the electromotive forces at the end of the signal line 4a and the end of the signal line 4b that are generated by a flow velocity V of the measured fluid and the magnetic field B1. The sum of the electromotive forces at the end of the signal line 4a and the end of the signal line 4b will be zero in an ideal state where the signal lines are completely mutually symmetric.

The total electromotive force difference Ed with the electromotive force difference Ecd that results from a change with passage of time in the magnetic field B1 and the electromotive force difference Evc that results from a flow velocity V of measured fluid and the magnetic field B1 is represented as follows according to Equation (18) and Equation (33).

$$Ed = Ecd + Evc \quad (34)$$
$$= rks \cdot \omega 0 \cdot b1 \cdot \exp\{j \cdot (\pi/2 + \theta 1 + \theta s)\} +$$
$$rkv \cdot V \cdot b1 \cdot \exp\{j \cdot (\theta 1 + \theta v)\}$$

The overall electromotive force sum with the electromotive force sum resulting from a change with passage of time in the magnetic field B1 and the electromotive force sum resulting from a flow velocity V of the measured fluid and the magnetic field B1 corresponds to the electromotive force sum Ecs (Equation (19)) resulting from a change with passage of time in the magnetic field B1 because the electromotive force sum resulting from a flow velocity V of the measured fluid and the magnetic field B1 is zero as described above. In this way, an electrode-to-electrode electromotive force in the first structure can be obtained.

Figure 12:
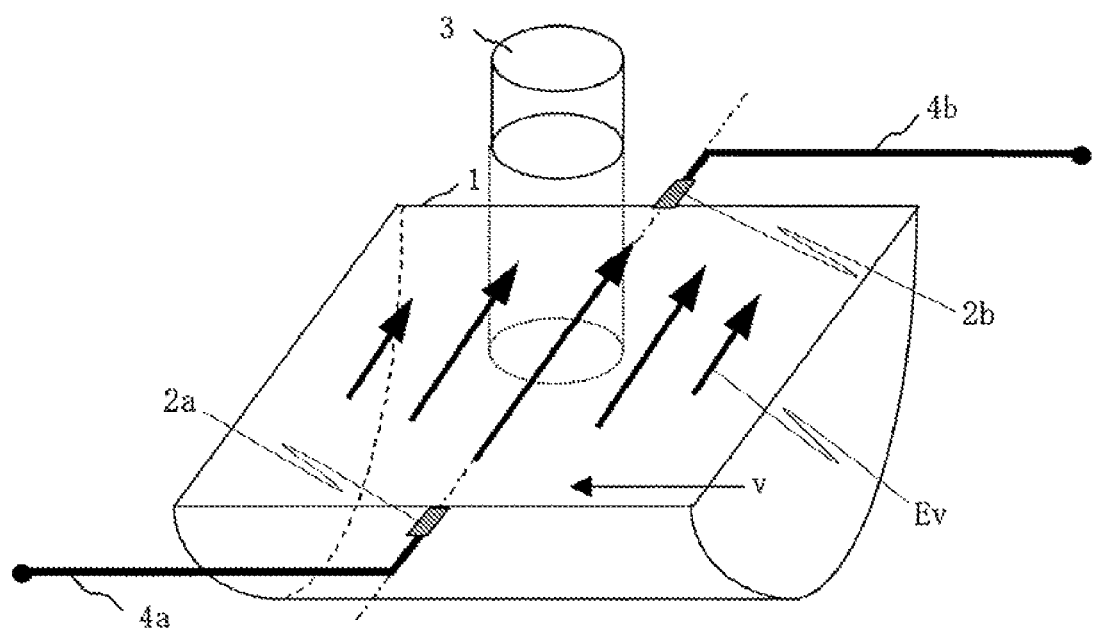
FIG. 12 illustrates electromotive forces between electrodes when the flow rate of a measured fluid is not zero in the second configuration of a structured document of the present invention.

A line-to-line electromotive forces in the second structure is now described. An electrode-to-electrode electromotive force Ev resulting from a flow velocity V of the measured fluid and the magnetic field B1 is not affected by arrangement of signal lines as illustrated in FIG. 12, and hence a value of an electrode-to-electrode electromotive force Evc which is a complex vector converted from the electrode-to-electrode electromotive force Ev is the same as that in the first structure.

The total electromotive force difference EdR with an electromotive force difference EcdR resulting from a change with passage of time in the magnetic field B1 and an electromotive force difference Evc resulting from a flow velocity V of the measured fluid and the magnetic field B1 can be represented as follows according to Equation (23) and Equation (33).

$$EdR = EcdR + Evc \quad (35)$$
$$= rkd \cdot \omega 0 \cdot b1 \cdot \exp\{j \cdot (\pi/2 + \theta 1 + \theta d)\} +$$
$$rkv \cdot V \cdot b1 \cdot \exp\{j \cdot (\theta 1 + \theta v)\}$$

The total electromotive force sum with an electromotive force sum resulting from a change with passage of time in the magnetic field B1 and an electromotive force sum resulting from a flow velocity V of the measured fluid and the magnetic field B1 corresponds to the electromotive force sum EcsR (Equation (24)) resulting from a change with passage of time in the magnetic field B1 because the electromotive force sum resulting from a flow velocity V of the measured fluid and the magnetic field B1 is zero as described above. In this way, a line-to-line electromotive forces in the second structure can be obtained.

A line-to-line electromotive forces in the third structure is now described. A value of an electrode-to-electrode electromotive force Evc, which is a complex vector converted from the electrode-to-electrode electromotive force Ev at the ends of the signal line 4a and 4b is the same as that in the first structure. The total line-to-line electromotive force difference E1d between the ends of the signal lines 4a and 4b, that is, an electromotive force difference including: the electromotive force difference Ecd1 between the force at the end of the signal line 4a and that at the end of the signal line 4b which results from a change with passage of time in the magnetic field B1; and an electromotive force difference Evc resulting from a flow velocity V of the measured fluid and the magnetic field B1, can be expressed by the following equation according to Equation (25) and Equation (33).

$$E1d = Ecd1 + Evc \quad (36)$$
$$= rks1 \cdot \omega 0 \cdot b1 \cdot \exp\{j \cdot (\pi/2 + \theta 1 + \theta s1)\} +$$
$$rkv \cdot V \cdot b1 \cdot \exp\{j \cdot (\theta 1 + \theta v)\}$$

Similarly, the total electromotive force difference E2d between the ends of the signal lines 4d and 4c, that is, an electromotive force difference including: the electromotive force difference Ecd2 between the force at the end of the signal line 4d and that at the end of the signal line 4c which results from a change with passage of time in the magnetic field B1; and an electromotive force difference Evc resulting from a flow velocity V of the measured fluid and the magnetic field B1, can be expressed by the following equation according to Equation (26) and Equation (33).

$$E2d = Ecd2 + Evc \quad (37)$$
$$= -rks2 \cdot \omega 0 \cdot b1 \cdot \exp\{j \cdot (\pi/2 + \theta 1 + \theta s2)\} +$$
$$rkv \cdot V \cdot b1 \cdot \exp\{j \cdot (\theta 1 + \theta v)\}$$

In this way, a line-to-line electromotive force in the third structure can be obtained.

Basic Principle to Detect State

The basic principle to detect a state in a measuring pipe is described. Hereinafter, the target property or state of fluid, state of a magnetic field, and state in a measuring pipe are each called a parameter. As described in Japanese Patent Application Publication No. 2006-90794, the parameters representing a property or state of a fluid include impedance, conductivity, permittivity, level, and cross sectional area. The parameters representing states in a measuring pipe include an amount of contaminant adhered to the inside of the measuring pipe (change in diameter of the measuring pipe).

Concept of ∂A/∂t Component and v×B Component

When a magnetic field is applied to a measured fluid as illustrated in FIGS. 2 to 4, the magnetic field being symmetric relative to a plane PLN where the electrodes 2a and 2b lie, the vector mapped on a complex coordinate plane based on the amplitude and phase difference of detected electromotive forces due to the symmetric excitation corresponds to a resultant vector Va+Vb from a vector Va for a ∂A/∂t component and a vector Vb for a v×B component.

$$Va = r\alpha \cdot \exp(j \cdot \theta\alpha) \cdot C \cdot \omega \tag{38}$$

$$Vb = r\beta \cdot \exp(j \cdot \theta\beta) \cdot C \cdot V \tag{39}$$

Figure 13:
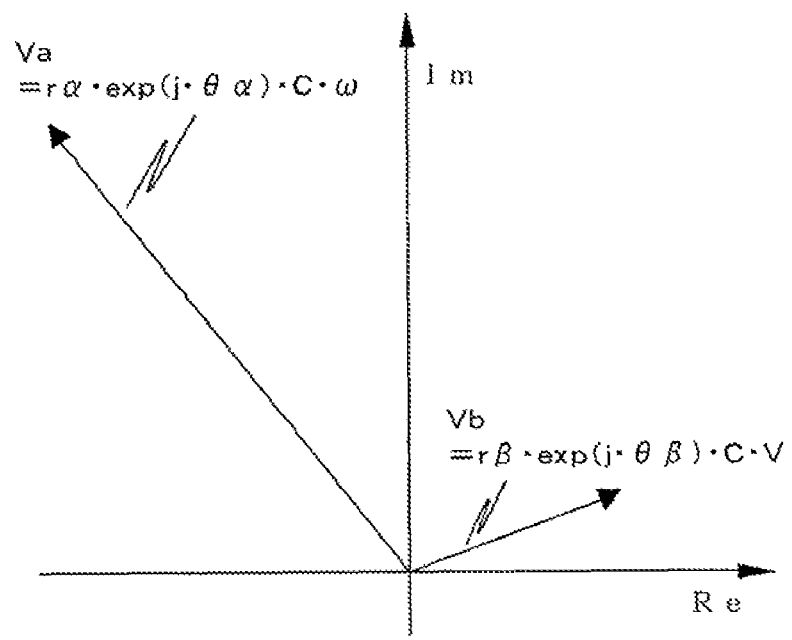
FIG. 13 illustrates a basic principle of state detection by a state detection device of the present invention.

These vectors Va and Vb are illustrated in FIG. 13, where Re is real axis, and Im is imaginary axis. The vector Va for a ∂A/∂t component, which is an electromotive force generated by a change in magnetic field, is in proportion to an excitation angular frequency ω. When the known proportionality constant to the vector Va is rα, and the direction of the vector Va is θα, a variable C such as a shift of magnetic field is given. The vector Vb for a v×B component, which is an electromotive force generated by flow of the measured fluid, is in proportion to a flow velocity V. When the known proportionality constant to the vector Vb is rβ, and the direction of the vector Vb is θβ, a variable C such as a shift of magnetic field is given. Note that the C in Equation (38) for a vector Va of a ∂A/∂t component is the same with the C in Equation (39) for a vector Vb of a v×B component.

Extraction of Vector Va for ∂A/∂t Component

There are three approaches to extract the vector Va of a ∂A/∂t component from the resultant vector Va+Vb. In a first approach, a phase difference of detected signals is used. The complex vector, which is directly calculated from the line-to-line electromotive forces, is a resultant vector from the vectors Va and Vb. This means the vectors Va and Vb cannot be directly measured. Here, the fact is used that the phase difference of the ∂A/∂t component and the phase difference of the v×B component from an applied magnetic field is substantially constant. Specifically, the vector Va has a known phase difference from the reference phase of a measured excitation current, and thereby the vector Va can be obtained by extracting a component having the phase difference from the resultant vector Va+Vb.

In a second approach, the vector Va is extracted by applying a magnetic field at a plurality of excitation frequencies to a measured fluid and utilizing the frequency offsets of components in the line-to-line electromotive forces. As described above, the complex vector, which is directly calculated from the line-to-line electromotive forces, is a resultant vector from the vectors Va and Vb, precluding direct calculation of the vectors Va and Vb using the complex vector. Here, the fact is used that the vector Va for a ∂A/∂t component is in proportion to the excitation angular frequency ω, whereas the vector Vb for a v×B component is not in proportion to the excitation angular frequency ω. Specifically, an excitation current having two components is applied to the exciting coil, the components having the same volume and different frequencies. After excitation with a current having the components at first and second frequencies, the resultant vector Va+Vb is calculated for each frequency. The difference between the resultant vector Va+Vb for the first frequency component and that for the second corresponds to the value of the vector Va for a ∂A/∂t component, and thereby the vector Va for a ∂A/∂t component can be extracted.

In a third approach, the vector Va is extracted using differences between electromotive forces in a plurality of signal lines. The third approach is effective in the case with signal lines running in different directions. As described above, the complex vector, which is directly calculated from the line-to-line electromotive forces, is a resultant vector from the vectors Va and Vb, precluding direct calculation of the vectors Va and Vb using the complex vector. Here, the fact is used that the v×B component detected at the ends of signal lines is independent of the arrangement of the signal lines, but the direction and value of the ∂A/∂t component vary depending on the arrangement.

Specifically, two signal lines are connected to one electrode, so that the signal lines are arranged symmetrical to the plane PLN where the electrode lies. This structure corresponds to that only with the electrode 2a and the signal lines 4a and 4c in FIG. 4. Removal of the electromotive force difference between the signal lines 4a and 4c cancels the v×B component, enabling the extraction of a ∂A/∂t component.

Alternatively, two signal lines may be connected to each of two electrodes, so that the signal lines are arranged symmetrical to the plane PLN where the electrodes lie. This structure corresponds to that in FIG. 4. Removal of the difference between a first electromotive force difference between the signal lines 4a and 4b and a second electromotive force difference between the signal lines 4c and 4d cancels the v×B component, enabling the extraction of a ∂A/∂t component.

Alternatively, one signal line may be connected to each of two electrodes, so that the signal lines are arranged approximately rotationally symmetric to each other around the axis of an exciting coil. This structure corresponds to that in FIG. 3. As illustrated in FIG. 3 with the signal lines 4a and 4b, the calculation of the resultant vector for the electromotive force sum at the signal lines 4a and 4b cancels the v×B component, and hence the vector Va can be substantially obtained by doubling the ∂A/∂t component at each signal line.

Extraction of Parameter

An approach to extract a parameter other than flow rate from the extracted ∂A/∂t component is now described. The ∂A/∂t component, which is independent of a flow velocity V of the measured fluid, can be used to measure a change in magnetic field and a state in a measuring pipe other than flow velocity.

The variation factor C in Equation (38) that varies depending on a target parameter is expressed as rkc·exp(j·θc). Then, a variation factor Cp is expressed by the following equation.

$$Cp = rkc[p] \cdot \exp(j \cdot \theta c[p]) \tag{40}$$

where rkc[p] is function of coefficient rkc, θc[p] is function of angle θc of a variation factor C (vector) with respect to the real axis, and Cp is variation factor C for parameter p.

Based on Equation (38), the variation factor Cp that varies depending on a target parameter is expressed by the following equation.

$$Cp = Va / \{r\alpha \cdot \exp(j \cdot \theta\alpha) \cdot \omega\} \tag{41}$$

The values for coefficient rα and angle θα can be checked at calibration, and the value Va/{rα·exp(j·θα)·ω} turns to be a rkc[p], and the angle with respect to the real axis turns to be a θc[p]. Accordingly, the value of parameter p can be obtained by calculating the value or phase of Va/{rα·exp(j·θα)·ω}, based on the relationship between the parameter p and a coefficient rkc[p] or between the parameter p and an angle θc[p] that is stored at the calibration.

Here, a sum of two vectors on a complex coordinate plane is further described. A sum of two vectors on a complex coordinate plane is expressed by the following equation.

$$\begin{aligned} A \cdot \exp(j \cdot a) + B \cdot \exp(j \cdot b) &= A \cdot \cos(a) + j \cdot A \cdot \sin(a) + \\ & \quad B \cdot \cos(b) + j \cdot B \cdot \sin(b) \\ &= \{A \cdot \cos(a) + B \cdot \cos(b)\} + \\ & \quad j \cdot \{A \cdot \sin(a) + B \cdot \sin(b)\} \end{aligned} \tag{42}$$

Then, Equation (42) is set to Cs·exp(j·cs), where Cs is expressed by the following equation.

$$Cs = sqrt[\{A \cdot \cos(a) + B \cdot \cos(b)\}^2 + \{A \cdot \sin(a) + B \cdot \sin(b)\}^2] \quad (43)$$
$$= sqrt[A^2 \cdot \cos^2(a) + B^2 \cdot \cos^2(b) + 2 \cdot A \cdot B \cdot \cos(a) \cdot \cos(b) +$$
$$A^2 \cdot \sin^2(a) + B^2 \cdot \sin^2(b) + 2 \cdot A \cdot B \cdot \sin(a) \cdot \sin(b)]$$
$$= sqrt[A^2 + B^2 + 2 \cdot A \cdot B \cdot \{\cos(a) \cdot \cos(b) + \sin(a) \cdot \sin(b)\}]$$
$$= sqrt\{A^2 + B^2 + A \cdot B \cdot \cos(a - b)\}$$

The phase cs can be expressed by the following equation.

$$cs = \tan^{-1}[\{A \cdot \sin(a) + B \cdot \sin(b)\} / \{A \cdot \cos(a) + B \cdot \cos(b)\}] \quad (44)$$

Here, a difference between two vectors on a complex coordinate plane is further described. A difference between two vectors on a complex coordinate plane is expressed by the following equation.

$$B \cdot \exp(j \cdot b) - A \cdot \exp(j \cdot a) = B \cdot \cos(b) + j \cdot B \cdot \sin(b) - \quad (45)$$
$$A \cdot \cos(a) - j \cdot A \cdot \sin(a)$$
$$= \{B \cdot \cos(b) - A \cdot \cos(a)\} +$$
$$j \cdot \{B \cdot \sin(b) - A \cdot \sin(a)\}$$

Then, Equation (45) is set to Cd·exp(j·cd), where Cd is expressed by the equation.

$$Cd = sqrt[\{B \cdot \cos(b) - A \cdot \cos(A)\}^2 + \{B \cdot \sin(b) - A \cdot \sin(a)\}^2] \quad (46)$$
$$= sqrt[B^2 \cdot \cos^2(b) + A^2 \cdot \cos^2(a) - 2 \cdot B \cdot A \cdot \cos(b) \cdot \cos(a) +$$
$$B^2 \cdot \sin^2(b) + A^2 \cdot \sin^2(a) - 2 \cdot B \cdot A \cdot \sin(b) \cdot \sin(a)]$$
$$= sqrt[B^2 + A^2 - 2 \cdot B \cdot A \cdot \{\cos(b) \cdot \cos(a) + \sin(b) \cdot \sin(a)\}]$$
$$= sqrt\{B^2 + A^2 - B \cdot A \cdot \cos(b - a)\}$$

The phase cs can be expressed by the following equation.

$$cs = \tan^{-1}[\{B \cdot \sin(b) - A \cdot \sin(a)\} / \{B \cdot \cos(b) - A \cdot \cos(a)\}] \quad (47)$$

Implementation Notes

Implementation notes are provided here. To calculate a parameter p based on a coefficient rkc[p] for example that is obtained from measurements, a table for inverse transformation should be prepared. The table for every parameter value is made using limited number of points at calibration. Here, the inverse transformation and table is described using a function f[p] as a representative example of a coefficient rkc[p] and an angle θc[p]. There are two approaches to make a table for inverse transformation: an approach to make a table by interpolating measured results at calibration (hereinafter, referred to as a first method); and an approach to make a table directly using theoretical equations (hereinafter, referred to as a second method).

Figure 14:
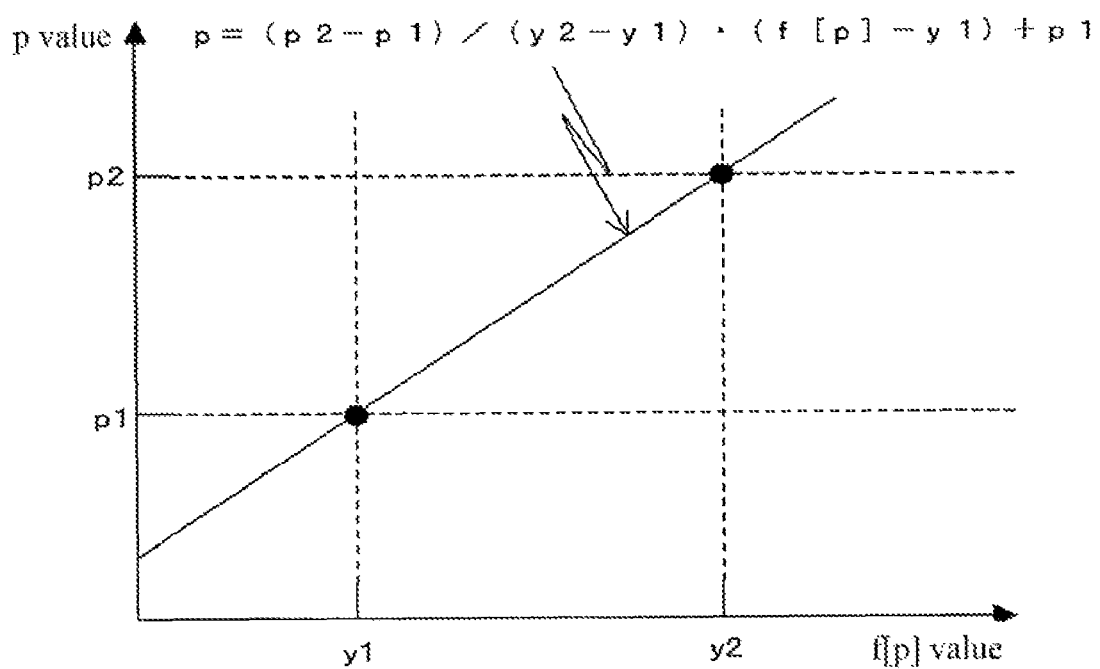
FIG. 14 illustrates a process for making a table in a state detection device of the present invention.

The first method is described. As illustrated in FIG. 14, if the measured result indicates the correspondences between a parameter p1 and f[p1]=y1, and a parameter p2 and f[p2]=y2 at calibration, a parameter p can be expressed by the following equation, using straight-line approximation to fit the two points.

$$p = (p2 - p1)/(y2 - y1) \cdot (f[p] - y1) + p1 \quad (48)$$

A table made according to Equation (48) can be used to obtain a parameter p from the function f[p] (i.e., a coefficient rkc [p] or angle θc[p]). The above example uses straight-line approximation, but any polynominal expression can be inverse-transformed similarly.

The second method is described. A parameter p can be expressed by the following equation, if the relationship between a parameter p and y=f[p] as a theoretical equation is determined upon designing and an inverse function $f^{-1}(y)$ exists.

$$p = f^{-1}(f[p]) \quad (49)$$

Figure 15:
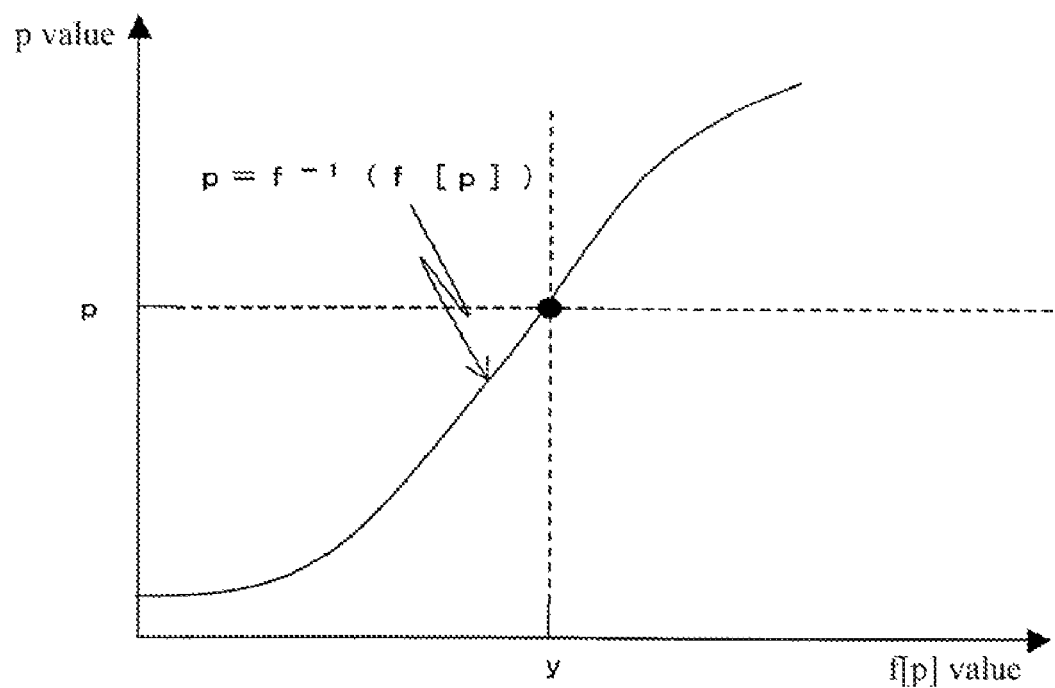
FIG. 15 illustrates another process for making a table in a state detection device of the present invention.

FIG. 15 illustrates the relationship given in Equation (49). When Equation (49) is stored as a table, a parameter p can be calculated from the function f[p] that is actually obtained at measurement after calibration.

First Embodiment

Now, a first embodiment of the present invention is described with reference to the drawings. The present embodiment uses the first structure that is above described with the principle, and the first extraction method to extract a vector Va of a ∂A/∂t component.

Figure 16:
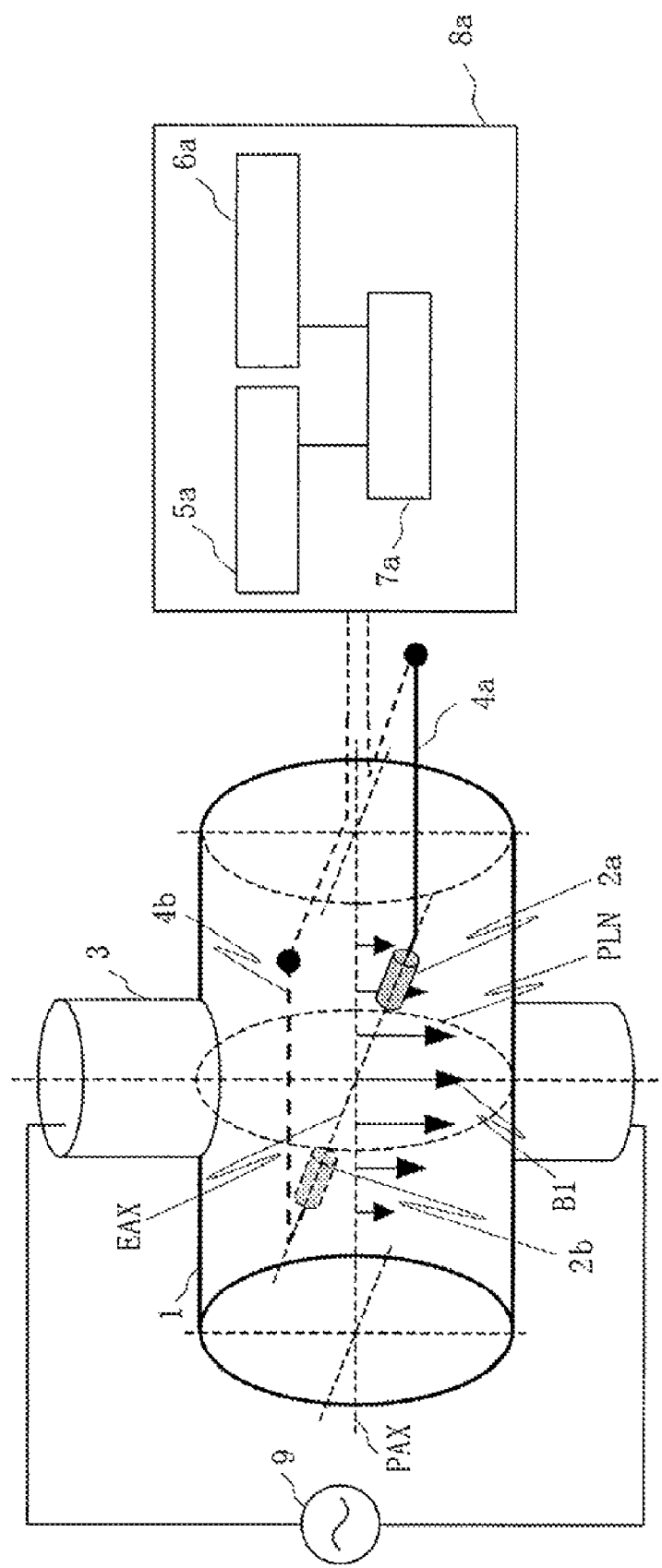
FIG. 16 is block diagram illustrating the configuration of a state detection device of a first embodiment according to the present invention.

FIG. 16 is a block diagram illustrating the configuration of a state detection device according to the first embodiment of the present invention. The state detection device of this embodiment includes: a measuring pipe 1 through which a measured fluid flows; a pair of electrodes 2a and 2b that are disposed perpendicular to both a magnetic field applied to the measured fluid and an axis PAX of the measuring pipe 1, and mutually opposite across the measuring pipe to be in contact with the measured fluid, so as to detect an electromotive force generated by the magnetic field and the measured fluid; an exciting coil 3 that applies, to the measured fluid, a time-changing magnetic field asymmetrical to a boundary plane PLN that is perpendicular to the axis PAX in the measuring pipe, the electrodes 2a and 2b being placed on the plane PLN; signal lines 4a and 4b connected the electrodes 2a and 2b respectively at an angle to a magnetic field that is parallel to the plane PLN, such that an electromotive force is generated by a change with passage of time in the magnetic field; a state quantifying unit 8a; and a power source 9 that supplies excitation current to the exciting coil to generate a magnetic field.

The state quantifying unit 8a is connected to the other ends of the signal lines 4a and 4b, and includes: a signal converting unit 5a that extracts a ∂A/∂t component by calculating a phase difference between a component at frequency ω0 and an excitation current in a resultant electromotive force obtained from the signal lines 4a and 4b, and further extracts a value or phase of a variation factor relevant to a parameter from the ∂A/∂t component; a state storing unit 6a (which is equivalent to the above described table) that stores in advance the relationship between the value or phase of the variation factor relevant to the parameter and the parameter; a state outputting unit 7a that outputs the parameter that corresponds to the extracted value or phase of the variation factor, based on the relationship stored in the state storing unit 6a.

In FIG. 16, when excitation current is supplied from the power source 9, a magnetic field is generated from the exciting coil 3. In the magnetic field, a magnetic field component (magnetic flux density) B1 perpendicular to both of the electrode axis EAX and the pipe axis PAX on the electrode axis EAX that extends between the electrodes 2a and 2b, and an excitation current I1 at the point of time are given by the following equations.

$$B1 = b1 \cdot \cos(\omega 0 \cdot t - \theta 1) \quad (50)$$

$$I1 = i1 \cdot \cos(\omega 0 \cdot t - \theta i1) \quad (51)$$

In Equation (50), b1 is amplitude of the magnetic flux density B1, ω0 is angular frequency, θ1 is a phase difference (phase delay) between the magnetic flux density B1 and ω0·t. Hereinafter, the magnetic flux density B1 is referred to magnetic field B1. In Equation (51), i1 is amplitude of the excitation current I1, θi1 is phase difference (phase delay) between the excitation current I1 and ω0·t. The relationship between an excitation current I and a magnetic field B generated under the above condition is expressed by the following equation.

$$B = ki \cdot I \quad (52)$$

In Equation (52), ki is a complex number relevant to a loss due to magnetic substance and tubing, which is expressed by the following equation.

$$ki = rki \cdot \cos(\theta i) + j \cdot rki \cdot \sin(\theta i) \quad (53)$$
$$= rki \cdot \exp(j \cdot \theta i)$$

where rki is proportional coefficient, θi is angle of vector ki with respect to the real axis.

The conversion of the magnetic field B1 in Equation (50) into a complex vector B1c using Equation (51) to Equation (53) results in as follows.

$$B1c = rki \cdot i1 \cdot \exp\{j \cdot (\theta i + \theta i1)\} \quad (54)$$

From Equation (50) and Equation (54), the following equations hold.

$$b1 = rki \cdot i1 \quad (55)$$

$$\theta1 = \theta i + \theta i1 \quad (56)$$

A line-to-line electromotive force difference is the difference between the electromotive force detected at the end of the signal line 4b on the signal converting unit side and that detected at the end of the signal line 4a on the signal converting unit side. In the total line-to-line electromotive force difference composed of the electromotive force differences in the form of complex vectors that are converted from a line-to-line electromotive force difference resulting from a change with passage of time in the magnetic field B1 and a line-to-line electromotive force difference resulting from a flow velocity V of the measured fluid and the magnetic field B1, a line-to-line electromotive force difference Ei0 for the component at an angular frequency ω0 is obtained by substituting Equation (55) and Equation (56) into Equation (34), and substituting rkv for γv·rks, which is expressed by the following equation.

$$Ei0 = rks \cdot \omega0 \cdot rki \cdot i1 \cdot \exp\{j \cdot (\pi/2 + \theta i + \theta i1 + \theta s)\} + \gamma v \cdot rks \cdot V \cdot rki \cdot i1 \cdot \exp\{j \cdot (\theta i + \theta i1 + \theta v)\} \quad (57)$$

The line-to-line electromotive force difference Ei0 expressed by Equation (57) is the signal detected at a signal converting unit 5a. In Equation (57), θi1 is a measurable phase of excitation current I1, and θi, θs, and θv are constants measurable at calibration. Thus, the line-to-line electromotive force difference Ei0 can be separated into that in (π/2+θi+θi1+θs) direction and that in (θi+θi1+θv) direction, which leads to the extraction of rks·ω0·rki·i1·exp{j·(π/2+θi+θi1+θs)} as a ∂A/∂t component. An electromotive force EiA for the ∂A/∂t components is expressed by the following equation.

$$EiA = rks \cdot \omega0 \cdot rki \cdot i1 \cdot \exp\{j \cdot (\pi/2 + \theta i + \theta i1 + \theta s)\} \quad (58)$$

Equation (58) irrelevant to a flow velocity V only includes the components generated by ∂A/∂t. Using the electromotive force EiA enables measurements of parameters such as states of a fluid and states in a measuring pipe, other than flow velocity. When a variation factor due to a parameter is Cp1 and the value of the parameter is set to p1, the variation factor Cp1 is expressed by the following equation according to Equation (40).

$$Cp1 = rkc[p1] \cdot \exp(j \cdot \theta c[p1]) \quad (59)$$

The variation factor Cp1 in Equation (58) is rewritten as follows.

$$Cp1 = rks \cdot rki \cdot i1 \cdot \exp(j \cdot \theta i1) \quad (60)$$
$$= EiA / [\omega0 \cdot \exp\{j \cdot (\pi/2 + \theta i + \theta s)\}]$$

Based on Equation (60), a value rkc[p1] and angle θc[p1] of the variation factor Cp1 with respect to the real axis are expressed by the following equations.

$$rkc[p1] = |EiA|/\omega0 \quad (61)$$

$$\theta c[p1] = \angle EiA - (\pi/2 + \theta i + \theta s) \quad (62)$$

The parameter p1 can be obtained based on the relationship between the parameter p1 and rkc[p1] or the relationship between the parameter p1 and an angle θc[p1] that are already confirmed by measurement at calibration.

The table 1 below shows the correspondence between the constants and variables in the above-described basic principle and those in the present embodiment. The angles θi, θs, and θv are constants that can be obtained in advance at calibration for example. As apparent from Table 1, the present embodiment is one specific example of the above basic principle.

TABLE 1

Correspondence Between Basic Principle and First Embodiment

| Constants and Variables of Basic Principle | Constants and Variables of First Embodiment |
|---|---|
| rα | 1 |
| rβ | γv |
| θα | π/2 + θi + θs |
| θβ | θi + θv |
| C | rks · rki · i1 · exp(j · θi1) |

Figure 17:
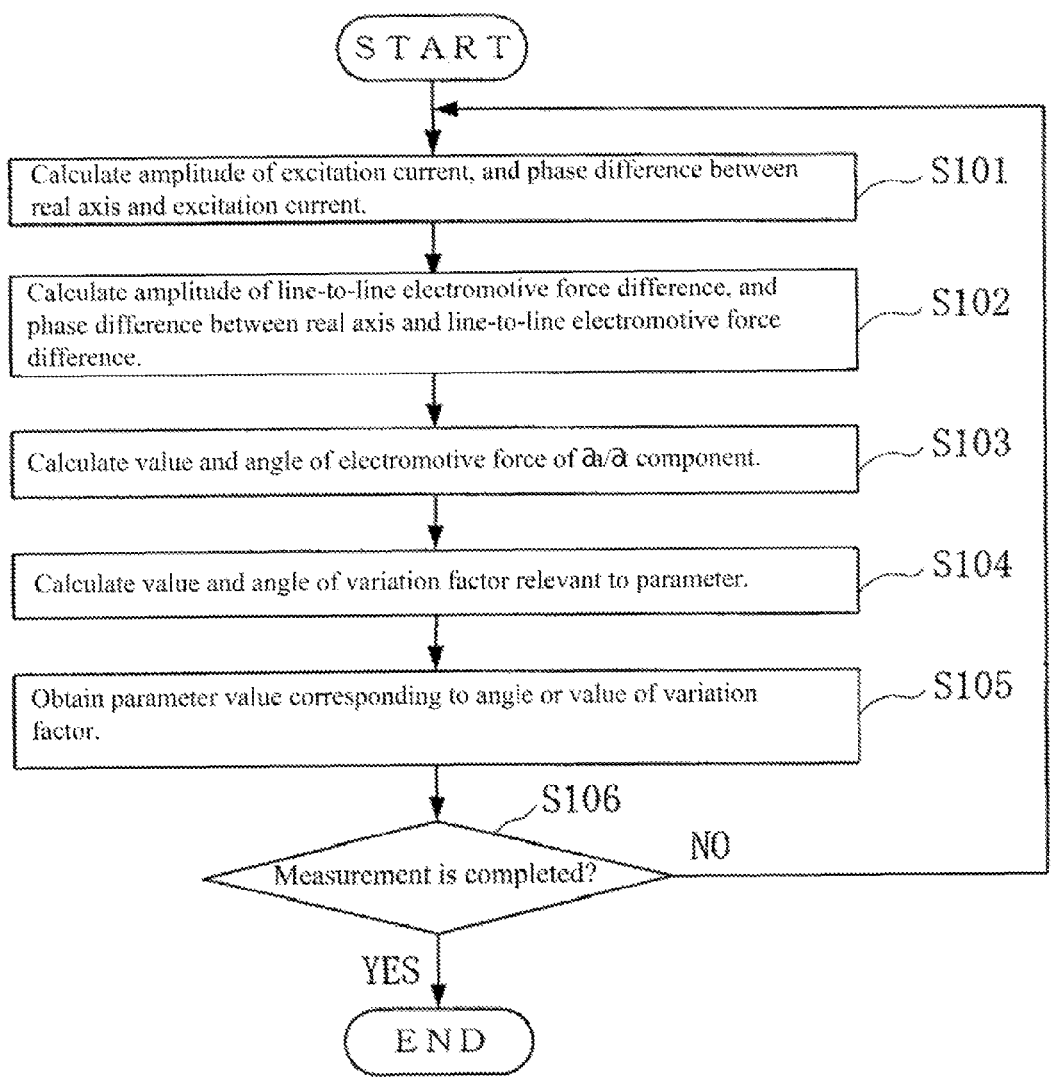
FIG. 17 is a flowchart illustrating operations of a state quantifying unit of the first embodiment according to the present invention.

Next, specific operations of the state detection device of the present embodiment are described. The power source 9 supplies excitation current I1 having a sine wave component at angular frequency ω0 to the exciting coil 3. FIG. 17 is a flowchart illustrating operations of the state quantifying unit 8a. First, in step S101 in FIG. 17, the signal converting unit 5a calculates an amplitude i1 of a component at angular frequency ω0 of the excitation current I1 and a phase difference θi1 between the real axis and the component at angular frequency ω0 of the excitation current I1 by a phase detector.

In step S102, the signal converting unit 5a calculates an amplitude r0 of a line-to-line electromotive force difference Ei0 in the component at angular frequency ω0, and obtains a phase difference φ0 between the real axis and the line-to-line electromotive force difference Ei0.

In step S103, the signal converting unit 5a calculates the angle and value of an electromotive force EiA that corresponds to a ∂A/∂t component in the line-to-line electromotive force difference Ei0. The process in step S103 is equivalent to the calculation of a ∂A/∂t component using Equation (58). The signal converting unit 5a calculates an ∠EiA of the electromotive force EiA with respect to the real axis, using the following equation.

$$\angle EiA = \pi/2 + \theta i + \theta i1 + \theta s \quad (63)$$

The signal converting unit 5a calculates the value of the electromotive force EiA, using the following equation.

$$|EiA|=r0\cdot\sin(\phi 0-\theta i-\theta i1-\theta v)/\sin(\pi/2-\theta s+\theta v) \quad (64)$$

The process in step S103 ends here.

In step S104, the signal converting unit 5a calculates the value and angle of a variation factor Cp1 relevant to a parameter p1. The signal converting unit 5a calculates the rkc[p1] of the variation factor Cp1 using Equation (61), and calculates the angle θc[p1] of the variation factor Cp1 with respect to the real axis using Equation (62).

The state storing unit 6a has, in advance, the relationship between the parameter p1 and the value rkc[p1] of the variation factor Cp1, or between the parameter p1 and the angle θc[p1] of the variation factor Cp1 stored therein in the form of an equation or a table. In step S105, the state outputting unit 7a calculates (or obtains from the state storing unit 6a) the value of the parameter p1 corresponding to rkc[p1] or θc[p1], with reference to the state storing unit 6a, based on the value rkc[p1] or the angle θc[p1] of variation factor Cp1 obtained at the signal converting unit 5a.

The state quantifying unit 8a performs the above process from steps S101 to S105 at a constant frequency until an instruction to finish measurement is given by an operator for example in step S106 (YES in step S106).

As described above, in the present embodiment, an electromotive force EiA (i.e., a vector Va of a ∂A/∂t component) is extracted from a line-to-line electromotive force difference Ei0 (i.e., a resultant vector Va+Vb), and a value or phase (angle) of a variation factor Cp1 relevant to a property or state of a fluid, a state of a magnetic field, or a state in a measuring pipe (parameter p1) is extracted from the electromotive force EiA, so as to obtain the parameter p1 based on the value or phase of the variation factor Cp1. Accordingly, independently of a flow velocity of a fluid, accurate detection of a property or state of the fluid, a state of a magnetic field, or a state in a measuring pipe is achieved. In the present embodiment, detection of states in a measuring pipe containing magnetic field and fluid can be achieved using the measuring pipe 1, the electrodes 2a and 2b, and the exciting coil 3 that are members of a detector of a conventional typical electromagnetic flowmeter, and arranging signal lines 4a and 4b such that an electromotive force is generated by a change with passage of time in a magnetic field. As a result, the effect that has been obtained only by a state detection device using asymmetrical excitation in Japanese Patent Application Publication No. 2006-90794 can be realized by a typical electromagnetic flowmeter without significant change in its structure.

In the present embodiment, either a value rkc[p1] or angle θc[p1] of a variation factor Cp1 is extracted from electromotive force EiA, but both of the value and angle may be extracted to obtain a parameter p1. In this case, the more sensitive of the value rkc[p1] or the angle θc[p1] is selected, and the parameter p1 is obtained based on the selected value or angle, for example. This enhances detection sensitivity.

In the present embodiment, a v×B component is obtained from calculation: Ei0−EiA. The calculation of a flow rate of a fluid using a v×B component is known in the technology of typical electromagnetic flowmeter, and is easily implemented in a computer in the state quantifying unit 8a. Accordingly, the present embodiment is operable as a flowmeter.

Second Embodiment

A second embodiment of the present invention is described. This embodiment uses the first structure that is above described with the principle, and the second extraction method to extract a vector Va of a ∂A/∂t component. In the present embodiment also, the state detection device has a structure similar to that in the first embodiment, and so the numeral references in FIG. 16 are used for description below.

In FIG. 16, in the magnetic field generated from the exciting coil 3, a magnetic field component (magnetic flux density) B1 perpendicular to both of the electrode axis EAX and the pipe axis PAX on the electrode axis EAX that extends between the electrodes 2a and 2b is given by the following equation.

$$B1=b1\cdot\cos(\omega 0\cdot t-\theta 1)+b1\cdot\cos(\omega 1\cdot t-\theta 1) \quad (65)$$

In Equation (65), b1 is amplitude of the magnetic flux density B1, ω0 is angular frequency, θ1 is a phase difference (phase delay) between the magnetic flux density B1 and the ω0·t. Hereinafter, the magnetic flux density B1 is referred to magnetic field B1. As in the first embodiment, a line-to-line electromotive force difference is the difference between the electromotive force detected at the end of the signal line 4b on the signal converting unit side and that detected at the end of the signal line 4a on the signal converting unit side. In the total line-to-line electromotive force difference composed of the electromotive force differences in the form of complex vectors that are converted from a line-to-line electromotive force difference resulting from a change with passage of time in the magnetic field B1 and a line-to-line electromotive force difference resulting from a flow velocity V of the measured fluid and the magnetic field B1, a line-to-line electromotive force difference Ed0 for the component at an angular frequency ω0 corresponds to Equation (34), and is expressed by the following equation.

$$Ed0=rks\cdot\omega 0\cdot b1\cdot\exp\{j\cdot(\pi/2+\theta 1+\theta s)\}+rkv\cdot V\cdot b1\cdot\exp\{j\cdot(\theta 1+\theta v)\} \quad (66)$$

In the total line-to-line electromotive force difference composed of the electromotive force differences in the form of complex vectors that are converted from a line-to-line electromotive force difference resulting from a change with passage of time in the magnetic field B1 and a line-to-line electromotive force difference resulting from a flow velocity V of the measured fluid and the magnetic field B1, a line-to-line electromotive force difference Ed1 of the component at an angular frequency oil corresponds to Equation (34), and is expressed by the following equation.

$$Ed1=rks\cdot\omega 1\cdot b1\cdot\exp\{j\cdot(\pi/2+\theta 1+\theta s)\}+rkv\cdot V\cdot b1\cdot\exp\{j\cdot(\theta 1+\theta v)\} \quad (67)$$

When θv=θs+Δθv and rkv=γv·rks are substituted in Equation (66) and Equation (67), the line-to-line electromotive force differences Ed0 and Ed1 are expressed by Equation (68) and Equation (69), respectively.

$$\begin{aligned}Ed0 &= rks\cdot\omega 0\cdot b1\cdot\exp\{j\cdot(\pi/2+\theta 1+\theta s)\} + \\ &\quad \gamma v\cdot rks\cdot V\cdot b1\cdot\exp\{j\cdot(\theta 1+\theta s+\Delta\theta v)\} \\ &= rks\cdot b1\cdot\exp\{j\cdot(\theta 1+\theta s)\}\cdot \\ &\quad \{\omega 0\cdot\exp(j\cdot\pi/2)+\gamma v\cdot V\cdot\exp(j\cdot\Delta\theta v)\}\end{aligned} \quad (68)$$

$$\begin{aligned}Ed1 &= rks\cdot\omega 1\cdot b1\cdot\exp\{j\cdot(\pi/2+\theta 1+\theta s)\} + \\ &\quad \gamma v\cdot rks\cdot V\cdot b1\cdot\exp\{j\cdot(\theta 1+\theta s+\Delta\theta v)\} \\ &= rks\cdot b1\cdot\exp\{j\cdot(\theta 1+\theta s)\}\cdot \\ &\quad \{\omega 1\cdot\exp(j\cdot\pi/2)+\gamma v\cdot V\cdot\exp(j\cdot\Delta\theta c)\}\end{aligned} \quad (69)$$

The following equation holds when the difference between the line-to-line electromotive force differences Ed0 and Ed1 is multiplied by $\omega 0/(\omega 0-\omega 1)$ to obtain a value EdA.

$$EdA = (Ed0 - Ed1) \cdot \omega 0/(\omega 0 - \omega 1) \quad (70)$$
$$= rks \cdot b1 \cdot \exp\{j \cdot (\theta 1 + \theta s)\} \cdot$$
$$\{\omega 0 \cdot \exp(j \cdot \pi/2) + \gamma v \cdot V \cdot \exp(j \cdot \Delta \theta v) -$$
$$\omega 1 \cdot \exp(j \cdot \pi/2) - \gamma v \cdot V \cdot \exp(j \cdot \Delta \theta v)\} \cdot \omega 0/(\omega 0 - \omega 1)$$
$$= rks \cdot \omega 0 \cdot b1 \cdot \exp\{j \cdot (\pi/2 + \theta 1 + \theta s)\}$$

The electromotive force difference EdA irrelevant to a flow velocity V only includes the components generated by $\partial A/\partial t$. Using the electromotive force difference EdA enables measurements of parameters such as states of a fluid and states in a measuring pipe, other than flow velocity. The electromotive force difference EdA is correctly obtained by multiplying an electromotive force difference between line-to-line electromotive force difference Ed0 and Ed1 by $\omega 0/(\omega 0-\omega 1)$. The magnification $\omega 0/(\omega 0-\omega 1)$ is used to facilitate expansion of equation.

When a variation factor due to a parameter is Cp2 and the value of the parameter is set to p2, the variation factor Cp2 is expressed by the following equation according to Equation (40).

$$Cp2 = rkc[p2] \cdot \exp(j \cdot \theta c[p2]) \quad (71)$$

The variation factor Cp2 in Equation (70) is rewritten by the following equation.

$$Cp2 = rks \cdot b1 \cdot \exp\{j \cdot (\theta 1 + \theta s)\} \quad (72)$$
$$= EdA/\{\omega 0 \cdot \exp(j \cdot \pi/2)\}$$

Based on Equation (72), the value rkc[p2] and angle $\theta$c[p2] of the variation factor Cp2 with respect to the real axis is expressed by the following equations.

$$rkc[p2] = |EdA|/\omega 0 \quad (73)$$

$$\theta c[p2] = \angle EdA - (\pi/2) \quad (74)$$

Based on the relationship between the parameter p2 and the value rkc[p2] or between the parameter p2 and the angle $\theta$c[p2] that is already confirmed by measurement at calibration, a parameter p2 can be obtained.

The table 2 below shows the correspondence between the constants and variables in the above-described basic principle and those in the present embodiment. As apparent from Table 2, the present embodiment is one specific example of the above basic principle.

TABLE 2

Correspondence Between Basic Principle and Second Embodiment

| Constants and Variables of Basic Principle | Constants and Variables of Second Embodiment |
|---|---|
| rα | 1 |
| rβ | γv |
| θα | π/2 |
| θβ | Δθv |
| C | rks · b1 · exp{j(θ1 + θs)} |

Next, specific operations of the state detection device of the present embodiment are described. The power source 9 supplies excitation current I1 having a sine wave component at a first angular frequency $\omega 0$ and a sine wave component at a second angular frequency $\omega 1$ to the exciting coil 3. The components at the first and second angular frequencies $\omega 0$ and $\omega 1$ in the excitation current have the same amplitude.

Figure 18:
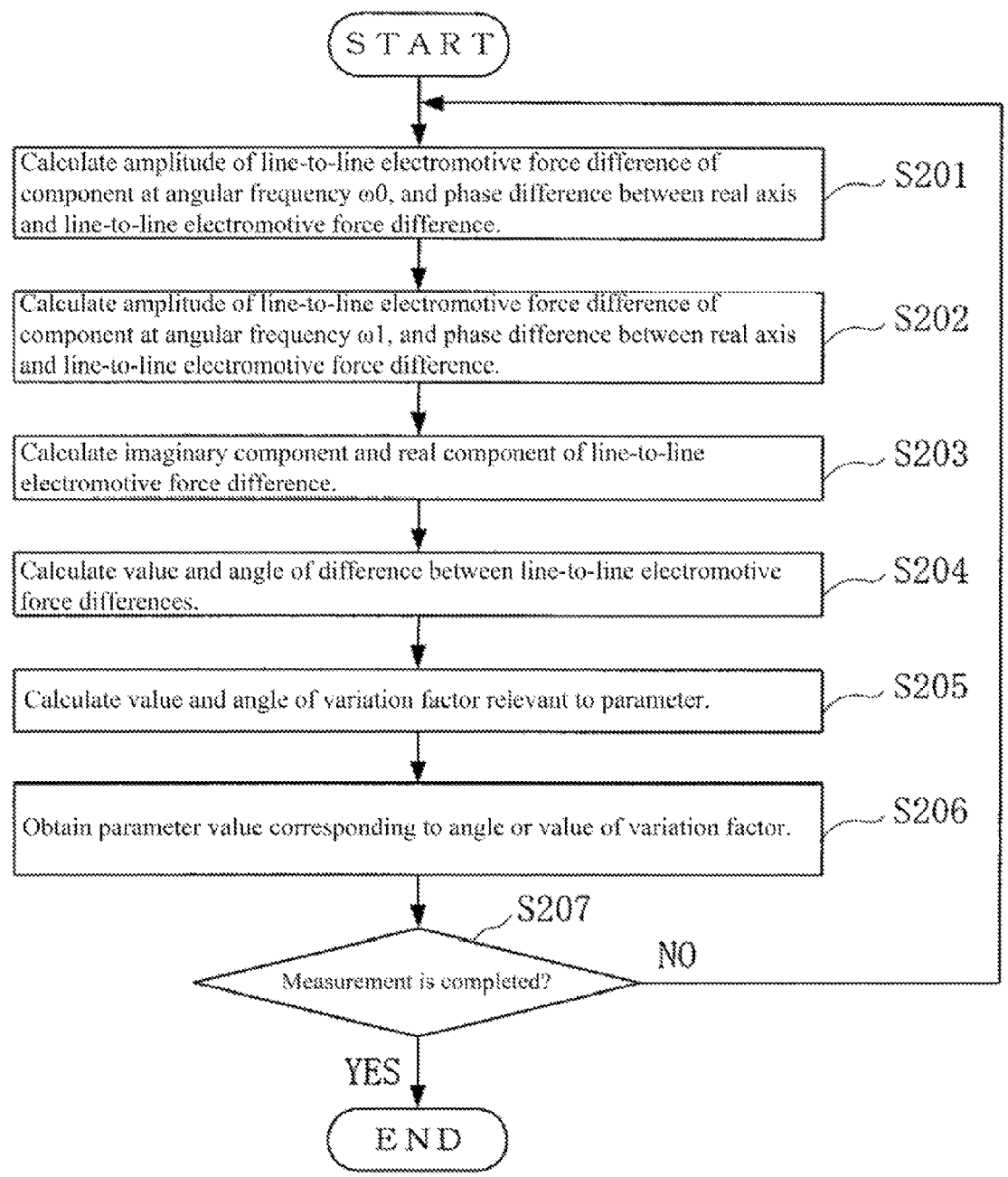
FIG. 18 is a flowchart illustrating operations of a state quantifying unit of a second embodiment according to the present invention.

FIG. 18 is a flowchart illustrating operations of the state quantifying unit 8a. First, in step S201 in FIG. 18, the signal converting unit 5a calculates an amplitude r0 at an electromotive force difference Ed0 of a component at an angular frequency $\omega 0$ and a phase difference $\phi 0$ between the real axis and the line-to-line electromotive force difference Ed0, in a line-to-line electromotive force difference by a phase detector. In step S202, the signal converting unit 5a calculates an amplitude r1 of an electromotive force difference Ed1 at an angular frequency $\omega 1$ and obtains a phase difference $\phi 1$ between the real axis and the line-to-line electromotive force difference Ed1, in the line-to-line electromotive force difference using a phase detector. The frequency separation of the line-to-line electromotive force differences Ed0 and Ed1 can be performed using a bandpass filter, but actually a comb-shaped digital filter called comb filter is used for easier separation into two components at angular frequencies $\omega 0$ and $\omega 1$.

In step S203, the signal converting unit 5a calculates a real axis component Ed0x and an imaginary axis component Ed0y of the line-to-line electromotive force difference Ed0, and a real axis component Ed1x and an imaginary axis component Ed1y of the line-to-line electromotive force difference Ed1 as follows.

$$Ed0x = r0 \cdot \cos(\phi 0) \quad (75)$$

$$Ed0y = r0 \cdot \sin(\phi 0) \quad (76)$$

$$Ed1x = r1 \cdot \cos(\phi 1) \quad (77)$$

$$Ed1y = r1 \cdot \sin(\phi 1) \quad (78)$$

In step S204, after the calculation using Equation (75) to Equation (78), the signal converting unit 5a calculates the value and angle of the electromotive force difference EdA between the line-to-line electromotive force differences Ed0 and Ed1. The process in step S204 is equivalent to the calculation of a $\partial A/\partial t$ component, and corresponds to the calculation using Equation (70). The signal converting unit 5a calculates the value |EdA| of the electromotive force difference EdA between the line-to-line electromotive force differences Ed0 and Ed1, using the following equation.

$$|EdA| = \{(Ed0x - Ed1x)^2 + (Ed0y - Ed1y)^2\}^{1/2} \cdot \omega 0/(\omega 0 - \omega 1) \quad (79)$$

Then, the signal converting unit 5a calculates an angle $\angle$EdA of the electromotive force difference EdA with respect to the real axis as follows.

$$\angle EdA = \tan^{-1}\{(Ed0y - Ed1y)/(Ed0x - Ed1x)\} \quad (80)$$

Here, the process in step S204 ends.

In step S205, the signal converting unit 5a calculates the value and angle of the variation factor Cp2 relevant to the parameter p2 from the electromotive force difference EdA. The signal converting unit 5a calculates the value rkc[p2] of the variation factor Cp2 using Equation (73), and an angle $\theta$c[p2] with respect to the real axis of the variation factor Cp2 using Equation (74).

The state storing unit 6a has, in advance, the relationship between the parameter p2 and the value rkc[p2] of the variation factor Cp2, or between the parameter p2 and the angle $\theta$c[p2] of the variation factor Cp2 stored therein in the form of an equation or a table. In step S206, the state outputting unit 7a calculates (or obtains from the state storing unit 6a) the value of the parameter p2 corresponding to rkc[p2] or θc[p2], with reference to the state storing unit 6a, based on the value rkc[p2] or the angle θc[p2] of variation factor Cp2 obtained at the signal converting unit 5a.

The state quantifying unit 8a performs the above process from steps S201 to S206 at a constant frequency until an instruction to finish measurement is given by an operator for example in step S207 (YES in step S207).

As described above, in the present embodiment, a magnetic field including two components having the same volume but different frequencies is applied to a measured fluid by an exciting coil 3, and an electromotive force EdA (i.e., a vector Va of a ∂A/∂t component) is extracted from the line-to-line electromotive force difference Ed0 from the components at the angular frequency ω0 and the line-to-line electromotive force difference Ed1 from the components at the angular frequency ω1, so that a value or a phase (angle) of the variation factor Cp2 relevant to a property or state of a fluid, a state of a magnetic field, or a state in a measuring pipe (i.e., a parameter p2) from the electromotive force EdA, so as to obtain the parameter p2 based on the value or phase of the variation factor Cp2. Accordingly, independently of a flow velocity of a fluid, accurate detection of a property or state of the fluid, a state of a magnetic field, or a state in a measuring pipe is achieved. In the present embodiment, detection of states in a measuring pipe containing magnetic field and fluid can be achieved using the measuring pipe 1, the electrodes 2a and 2b, and the exciting coil 3 that are members of a detector of a conventional typical electromagnetic flowmeter, and arranging signal lines 4a and 4b such that electromotive force is generated by a change with passage of time in a magnetic field. As a result, the effect that has been obtained only by a state detection device using asymmetrical excitation in Japanese Patent Application Publication No. 2006-90794 can be realized by a typical electromagnetic flowmeter without significant change in its structure.

In the present embodiment, an excitation current that simultaneously includes two sine wave components at angular frequencies ω0 and ω1 is supplied to the exciting coil 3, but an excitation current including a component at angular frequencies ω0 and that at angular frequencies ω1 may be alternatively supplied to the exciting coil 3.

In the present embodiment, either a value rkc[p2] or angle θc[p2] of a variation factor Cp2 is extracted from electromotive force EdA, but both of the value and angle may be extracted to obtain a parameter p2. In this case, the more sensitive of the value rkc[p2] or the angle θc[p2] is selected, and the parameter p2 is obtained based on the selected value or angle, for example. This enhances detection sensitivity.

In the present embodiment, a v×B component is obtained from calculation: Ed0−EiA. The calculation of a flow rate of fluid using the v×B component is known in the technology of typical electromagnetic flowmeter, and is easily implemented in a computer in the state quantifying unit 8a. Accordingly, the present embodiment is operable as a flowmeter.

Third Embodiment

A third embodiment of the present invention is described. This embodiment uses the second structure that is above described with the principle, and the third extraction method to extract a vector Va of a ∂A/∂t component.

Figure 19:
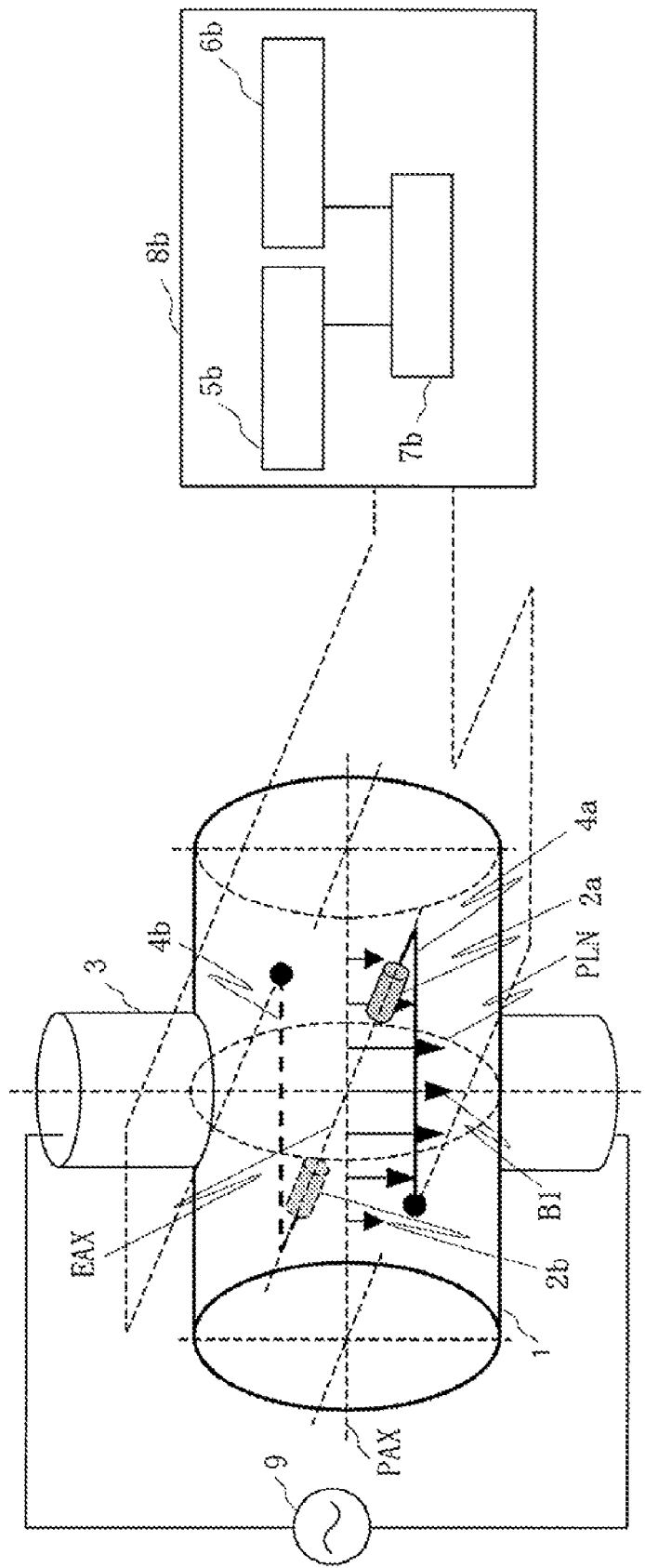
FIG. 19 is block diagram illustrating the configuration of a state detection device of a third embodiment according to the present invention.

FIG. 19 is a block diagram illustrating the configuration of a state detection device according to the third embodiment of the present invention. The state detection device of this embodiment includes: a measuring pipe 1; a pair of electrodes 2a and 2b; an exciting coil 3; signal lines 4a and 4b connected to the electrodes 2a and 2b respectively at one end thereof and extending in opposite directions from a plane PLN where the electrodes 2a and 2b lie; a state quantifying unit 8a; and a power source 9.

The state quantifying unit 8b is connected to the other ends of the signal lines 4a and 4b, and includes: a signal converting unit 5b that obtains the sum of the resultant electromotive forces from the signal line 4a and 4b to extract a ∂A/∂t component and further extracts a value or phase of a variation factor relevant to a parameter from the ∂A/∂t component; a state storing unit 6b (which is equivalent to the above described table) that stores in advance the relationship between the value or phase of the variation factor relevant to the parameter and the parameter; a state outputting unit 7b that outputs the parameter that corresponds to the extracted value or phase of the variation factor, based on the relationship stored in the state storing unit 6b.

In FIG. 19, in the magnetic field generated from the exciting coil 3, a magnetic field component (magnetic flux density) B1 perpendicular to both of the electrode axis EAX and the pipe axis PAX on the electrode axis EAX that extends between electrodes 2a and 2b is given by the following equation.

$$B1 = b1 \cdot \cos(\omega 0 \cdot t - \theta 1) \tag{81}$$

In Equation (81), b1 is amplitude of the magnetic flux density B1, ω0 is angular frequency, θ1 is a phase difference (phase delay) between the magnetic flux density B1 and the ω0·t. Hereinafter, the magnetic flux density B1 is referred to magnetic field B1. As in the first embodiment, a line-to-line electromotive force difference is the difference between the electromotive force detected at the end of the signal line 4b on the signal converting unit side and that detected at the end of the signal line 4a on the signal converting unit side. The sum of line-to-line electromotive forces is composed of the electromotive force detected at the end of the signal line 4b on the signal converting unit side and that detected at the end of the signal line 4a on the signal converting unit side.

In the total line-to-line electromotive force difference composed of the electromotive force differences in the form of complex vectors that are converted from a line-to-line electromotive force difference resulting from a change with passage of time in the magnetic field B1 and a line-to-line electromotive force difference resulting from a flow velocity V of the measured fluid and the magnetic field B1, a line-to-line electromotive force difference EdR0 for the component at an angular frequency ω0 corresponds to Equation (35), and is expressed by the following equation.

$$EdR0 = rkd \cdot \omega 0 \cdot b1 \cdot \exp\{j \cdot (\pi/2 + \theta 1 + \theta d)\} + rkv \cdot V \cdot b1 \cdot \exp\{j \cdot (\theta 1 + \theta v)\} \tag{82}$$

In the sum of line-to-line electromotive forces composed of the electromotive force sum in the form of complex vectors that are converted from the sum of a line-to-line electromotive force resulting from a change with passage of time in the magnetic field B1 and a line-to-line electromotive force difference resulting from a flow velocity V of the measured fluid and the magnetic field B1, a line-to-line electromotive force sum EsR0 for the components at an angular frequency ω0 corresponds to Equation (24), and is expressed by the following equation.

$$EsR0 = rks \cdot \omega 0 \cdot b1 \cdot \exp\{j \cdot (\pi/2 + \theta 1 + \theta s)\} \tag{83}$$

When the phrases θv=θs+Δθv and rkv=γv·rks are substituted in Equation (82), the line-to-line electromotive force difference EdR0 is expressed by the following equation.

$$EdR0 = rkd \cdot \omega 0 \cdot b1 \cdot \exp\{j \cdot (\pi/2 + \theta 1 + \theta d)\} + \gamma v \cdot rks \cdot V \cdot b1 \cdot \exp\{j \cdot (\theta 1 + \theta s + \Delta \theta v)\} \tag{84}$$

The line-to-line electromotive force sum EsR0 in Equation (83) irrelevant to a flow velocity V only includes the components generated by $\partial A/\partial t$. Using the line-to-line electromotive force sum EsR0 enables measurements of parameters such as states of a fluid and states in a measuring pipe, other than flow velocity. When a variation factor due to a parameter is Cp3 and the value of the parameter is set to p3, the variation factor Cp3 is expressed by the following equation according to Equation (40).

$$Cp3=rkc[p3]\cdot\exp(j\cdot\theta c[p3]) \quad (85)$$

The variation factor Cp3 in Equation (85) is rewritten by the following equation.

$$Cp3 = rks \cdot b1 \cdot \exp\{j \cdot (\theta 1 + \theta s)\} \quad (86)$$
$$= EsR0/\{\omega 0 \cdot \exp(j \cdot \pi/2)\}$$

Based on Equation (86), a value rkc[p3] and angle θc[p3] of the variation factor Cp3 with respect to the real axis are expressed by the following equations.

$$rkc[p3]=|EsR0|/\omega 0 \quad (87)$$

$$\theta c[p3]=\angle EsR0-(\pi/2) \quad (88)$$

Based on the relationship between the parameter p3 and the value rkc[p3] or between the parameter p3 and the angle θc[p3] that is already confirmed by measurement at calibration, a parameter p3 can be obtained.

The table 3 below shows the correspondence between the constants and variables in the above-described basic principle and those in the present embodiment. As apparent from Table 3, the present embodiment is one specific example of the above basic principle.

TABLE 3

Correspondence Between Basic Principle and Third Embodiment

| Constants and Variables of Basic Principle | Constants and Variables of Third Embodiment |
|---|---|
| rα | 1 |
| rβ | γv |
| θα | π/2 |
| θβ | Δθv |
| C | rks · b1 · exp{j(θ1 + θs)} |

Next, specific operations of the state detection device of the present embodiment are described. As in the first embodiment, the power source 9 supplies excitation current I1 having a sine wave component at an angular frequency ω0 to the exciting coil 3.

Figure 20:
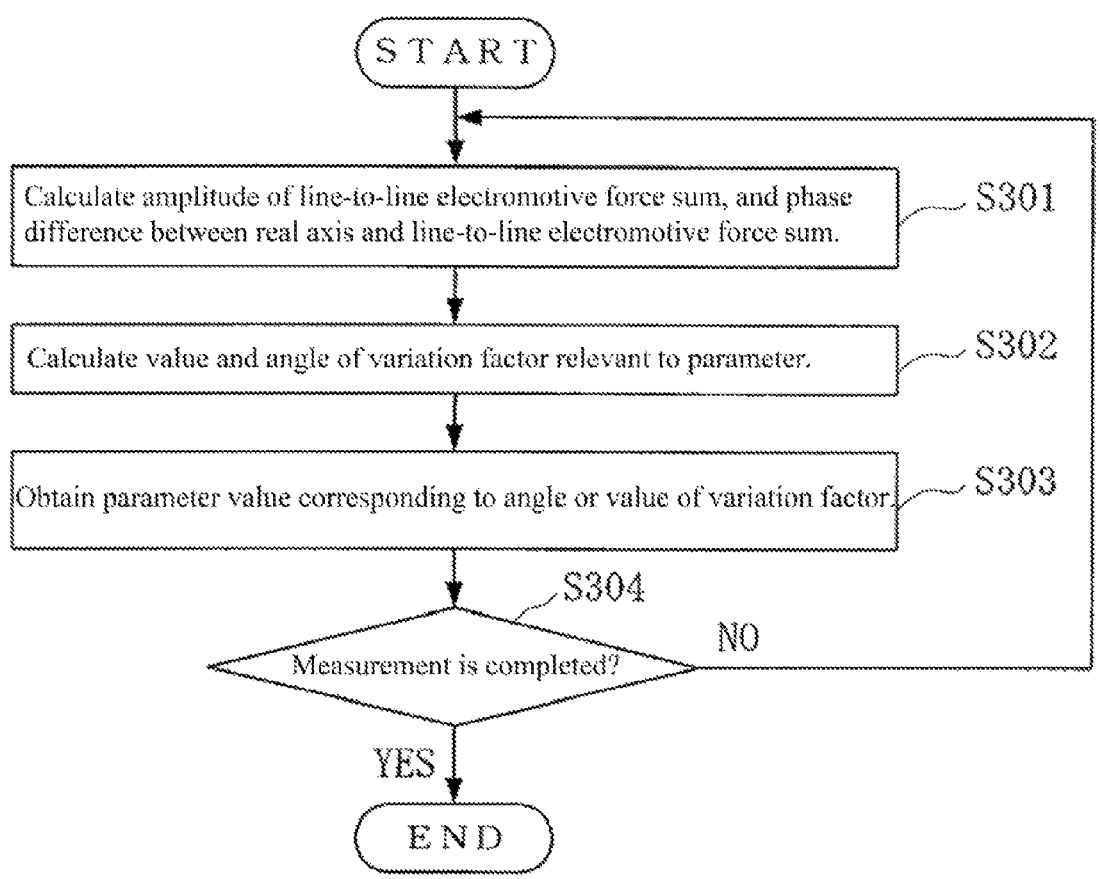
FIG. 20 is a flowchart illustrating operations of a state quantifying unit of the third embodiment according to the present invention.

FIG. 20 is a flowchart illustrating operations of the state quantifying unit 8b. First, in step S301 in FIG. 20, the signal converting unit 5b calculates an amplitude rs of a component at an angular frequency ω0 and a phase difference φs between the real axis and the line-to-line electromotive force sum EsR0, in a line-to-line electromotive force sum EsR0 by a phase detector.

In step S302, the signal converting unit 5b calculates a value and angle of the variation factor Cp3 relevant to a parameter p3, from the line-to-line electromotive force sum EsR0. The signal converting unit 5b calculates a value rkc[p3] of the variation factor Cp3 as follows.

$$rkc[p3]=rs/\omega 0 \quad (89)$$

Then, the signal converting unit 5b calculates an angle θc[p3] of the variation factor Cp3 as follows.

$$\theta c[p3]=\phi s-(\pi/2) \quad (90)$$

Here, the process in step S302 ends.

The state storing unit 6b has, in advance, the relationship between the parameter p3 and the value rkc[p3] of the variation factor Cp3, or between the parameter p3 and the angle θc[p3] of the variation factor Cp3 stored therein in the form of an equation or a table. In step S303, the state outputting unit 7b calculates (or obtains from the state storing unit 6a) the value of the parameter p3 corresponding to rkc[p3] or θc[p3], with reference to the state storing unit 6b, based on the value rkc[p3] or the angle θc[p3] of variation factor Cp3 obtained at the signal converting unit 5b.

The state quantifying unit 8b performs the above process from steps S301 to S303 at a constant frequency until an instruction to finish measurement is given by an operator for example in step S304 (YES in step S304).

As described above, in the present embodiment, a line-to-line electromotive force sum EsR0 is extracted as a $\partial A/\partial t$ component, and a value of phase (angle) of the variation factor Cp3 relevant to a parameter 3 such as a property or state of a fluid, a state of a magnetic field, or a state in a measuring pipe is extracted from the line-to-line electromotive force sum EsR0, so as to obtain the parameter p3 based on the value or phase of the variation factor Cp3. Accordingly, independently of a flow velocity of a fluid, accurate detection of a property or state of the fluid, a state of a magnetic field, or a state in a measuring pipe is achieved. In the present embodiment, detection of states in a measuring pipe containing magnetic field and fluid can be achieved using the measuring pipe 1, the electrodes 2a and 2b, and the exciting coil 3 that are members of a detector of a conventional typical electromagnetic flowmeter, and arranging signal lines 4a and 4b in the opposite directions from the plane PLN where the electrodes 2a and 2b lie. As a result, the effect that has been obtained only by a state detection device using asymmetrical excitation in Japanese Patent Application Publication No. 2006-90794 can be realized by a typical electromagnetic flowmeter without significant change in its structure.

In the present embodiment, either a value rkc[p3] or angle θc[p3] of a variation factor Cp3 is extracted from the line-to-line electromotive force sum EsR0, but both of the value and angle may be extracted to obtain a parameter p3. In this case, the more sensitive of the value rkc[p3] or the angle θc[p3] is selected, and the parameter p3 is obtained based on the selected value or angle, for example. This enhances detection sensitivity.

In the present embodiment, the line-to-line electromotive force difference EdR0 is substantially equal to a v×B component. The calculation of a flow rate of a fluid using the v×B component is known in the technology of typical electromagnetic flowmeter, and is easily implemented in a computer in the state quantifying unit 8a. Accordingly, the present embodiment is operable as a flowmeter.

Fourth Embodiment

A fourth embodiment of the present invention is described. This embodiment uses the above-described third structure, and the third extraction method to extract a vector Va of a $\partial A/\partial t$ component.

Figure 21:
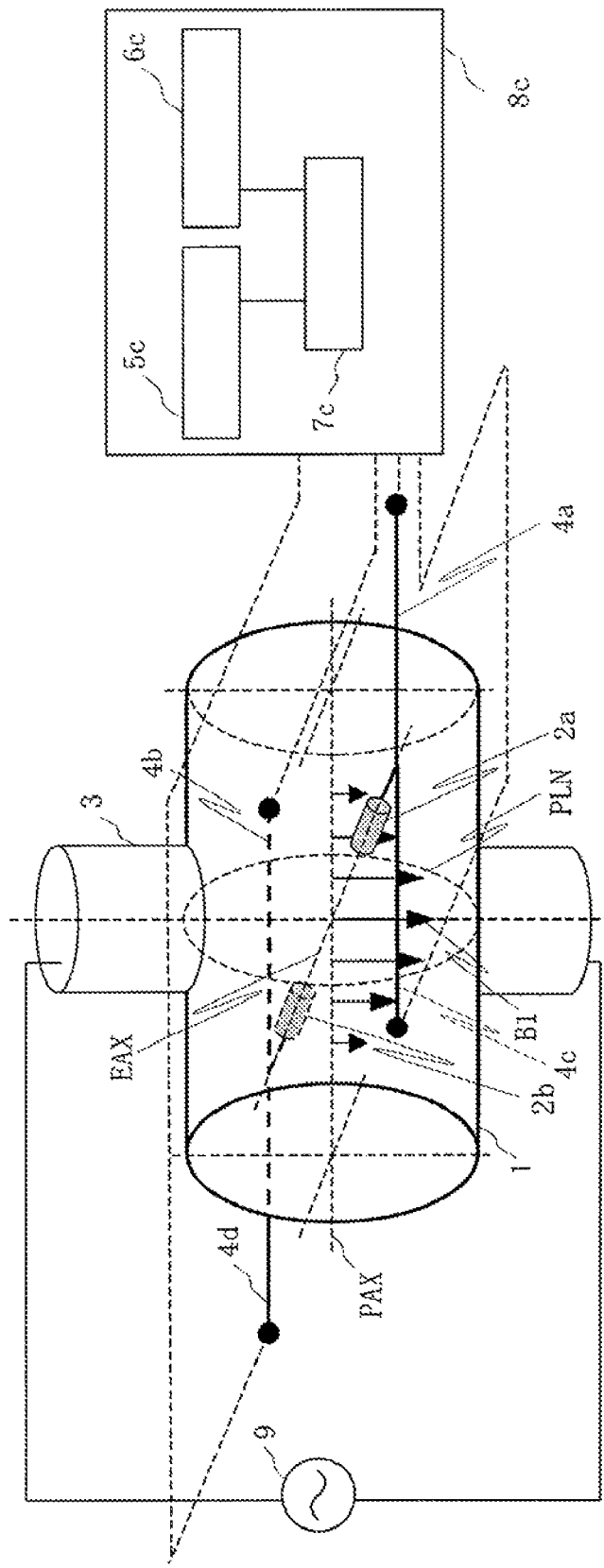
FIG. 21 is block diagram illustrating the configuration of a state detection device of a fourth embodiment according to the present invention.

FIG. 21 is a block diagram illustrating the configuration of a state detection device according to the fourth embodiment of the present invention. The state detection device of this embodiment includes: a measuring pipe 1; a pair of electrodes 2a and 2b; an exciting coil 3; signal lines 4a and 4b connected to the electrodes 2a and 2b respectively at one end thereof, and signal lines 4c and 4d connected to the electrodes 2a and 2b respectively at one end thereof in the opposite direction to that of the signal lines 4a and 4b from a plane PLN where the electrodes 2a and 2b lie; a state quantifying unit 8c; and a power source 9.

The state quantifying unit 8c is connected to the other ends of the signal lines 4a to 4d, and includes: a signal converting unit 5c that obtains an amplitude and phase of a first resultant electromotive forces obtained from the first signal lines 4a and 4b, and an amplitude and phase of a second resultant electromotive forces obtained from the second signal lines 4c and 4d, and extracts an electromotive force difference between the first and second resultant electromotive forces as a ∂A/∂t component based on the amplitudes and phases, so as to extract a value or phase of a variation factor relevant to a parameter from the ∂A/∂t component; a state storing unit 6c (which is equivalent to the above described table) that stores in advance the relationship between the value or phase of the variation factor relevant to the parameter and the parameter; a state outputting unit 7a that outputs a parameter that corresponds to the extracted value or phase of the extracted variation factor, based on the relationship stored In FIG. 21, in the magnetic field generated from the exciting coil 3, a magnetic field component (magnetic flux density) B1 perpendicular to both of the electrode axis EAX and the pipe axis PAX on the electrode axis EAX that extends between electrodes 2a and 2b is given by the following equation.

$$B1 = b1 \cdot \cos(\omega 0 \cdot t - \theta 1) \quad (91)$$

In Equation (91), b1 is amplitude of the magnetic flux density B1, $\omega 0$ is angular frequency, $\theta 1$ is a phase difference (phase delay) between the magnetic flux density B1 and the $\omega 0 \cdot t$. Hereinafter, the magnetic flux density B1 is referred to magnetic field B1. The signal lines 4a and 4b are defined as first signal lines connected to the electrodes 2a and 2b, whereas signal lines 4c and 4d are defined as second signal lines connected to the electrodes 2a and 2b. The difference between the electromotive force detected at the end of the signal line 4b on the signal converting unit side and that detected at the end of the signal line 4a on the signal converting unit side is a first line-to-line electromotive force difference, whereas the difference between the electromotive force detected at the end of the signal line 4d on the signal converting unit side and that detected at the end of the signal line 4c on the signal converting unit side is a second line-to-line electromotive force difference.

In the total first line-to-line electromotive force difference composed of the electromotive force differences in the form of complex vectors that are converted from the first line-to-line electromotive force difference resulting from a change with passage of time in the magnetic field B1 and the first line-to-line electromotive force difference resulting from a flow velocity V of the measured fluid and the magnetic field B1, a line-to-line electromotive force difference E1d0 for the components at an angular frequency $\omega 0$ corresponds to Equation (36), and is expressed by the following equation.

$$E1d0 = rks1 \cdot \omega 0 \cdot b1 \cdot \exp\{j \cdot (\pi/2 + \theta 1 + \theta s1)\} + rkv \cdot V \cdot b1 \cdot \exp\{j \cdot (\theta 1 + \theta v)\} \quad (92)$$

In the total second line-to-line electromotive force difference composed of the electromotive force differences in the form of complex vectors that are converted from the second line-to-line electromotive force difference resulting from a with passage of time change in the magnetic field B1 and the second line-to-line electromotive force difference resulting from a flow velocity V of the measured fluid and the magnetic field B1, a line-to-line electromotive force difference E2d0 for the components at an angular frequency coo corresponds to Equation (37), and is expressed by the following equation.

$$E2d0 = -rks2 \cdot \omega 0 \cdot b1 \cdot \exp\{j \cdot (\pi/2 + \theta 1 + \theta s2)\} + rkv \cdot V \cdot b1 \cdot \exp\{j \cdot (\theta 1 + \theta v)\} \quad (93)$$

Based on Equation (92) and Equation (93), the sum Esd of the first line-to-line electromotive force difference E1d0 and the second line-to-line electromotive force difference E2d0 is expressed by the following equation.

$$\begin{aligned} Esd &= E1d0 + E2d0 \\ &= rks1 \cdot \omega 0 \cdot b1 \cdot \exp\{j \cdot (\pi/2 + \theta 1 + \theta s1)\} + \\ &\quad rkv \cdot V \cdot b1 \cdot \exp\{j \cdot (\theta 1 + \theta v)\} - \\ &\quad rks2 \cdot \omega 0 \cdot b1 \cdot \exp\{j \cdot (\pi/2 + \theta 1 + \theta s2)\} + \\ &\quad rkv \cdot V \cdot b1 \cdot \exp\{j \cdot (\theta 1 + \theta v)\} \\ &= \{rks1 \cdot \exp(j \cdot \theta s1) - rks2 \cdot \exp(j \cdot \theta s2)\} \cdot \omega 0 \cdot b1 \cdot \\ &\quad \exp\{j \cdot (\pi/2 + \theta 1)\} + 2 \cdot rkv \cdot V \cdot b1 \cdot \exp\{j \cdot (\theta 1 + \theta v)\} \end{aligned} \quad (94)$$

Based on Equation (92) and Equation (93), the difference Edd between the first line-to-line electromotive force difference E1d0 and the second line-to-line electromotive force difference E2d0 is expressed by the following equation.

$$\begin{aligned} Edd &= E1d0 + E2d0 \\ &= rks1 \cdot \omega 0 \cdot b1 \cdot \exp\{j \cdot (\pi/2 + \theta 1 \cdot \theta s1)\} + \\ &\quad rkv \cdot V \cdot b1 \cdot \exp\{j \cdot (\theta 1 + \theta v)\} + \\ &\quad rks2 \cdot \omega 0 \cdot b1 \cdot \exp\{j \cdot (\pi/2 + \theta 1 + \theta s2)\} - \\ &\quad rkv \cdot V \cdot b1 \cdot \exp\{j \cdot (\theta 1 + \theta v)\} \\ &= \{rks1 \cdot \exp(j \cdot \theta s1) + rks2 \cdot \exp(j \cdot \theta s2)\} \cdot \omega 0 \cdot b1 \cdot \\ &\quad \exp\{j \cdot (\pi/2 + \theta 1)\} \end{aligned} \quad (95)$$

For easier handling of equations, the sum of the two vectors: $rks1 \cdot \exp(j \cdot \theta s1)$ and $rks2 \cdot \exp(j \cdot \theta s2)$ is transformed to $rkss \cdot \exp(j \cdot \theta ss)$ as in Equation (96), whereas the difference between the two vectors: $rks1 \cdot \exp(j \cdot \theta s1)$ and $rks2 \cdot \exp(j \cdot \theta s2)$ is transformed to $rksd \cdot \exp(j \cdot \theta sd)$ as in Equation (97).

$$rks1 \cdot \exp(j \cdot \theta s1) + rks2 \cdot \exp(j \cdot \theta s2) = rkss \cdot \exp(j \cdot \theta ss) \quad (96)$$

$$rks1 \cdot \exp(j \cdot \theta s1) - rks2 \cdot \exp(j \cdot \theta s2) = rksd \cdot \exp(j \cdot \theta sd) \quad (97)$$

The electromotive force sum Esd in Equation (94) is transformed as follows using Equation (97), whereas the electromotive force difference Edd in Equation (95) is transformed as follows using Equation (96).

$$Esd = rksd \cdot \exp(j \cdot \theta sd) \cdot \omega 0 \cdot b1 \cdot \exp\{j \cdot (\pi/2 + \theta 1)\} + 2 \cdot rkv \cdot V \cdot b1 \cdot \exp\{j \cdot (\theta 1 + \theta v)\} \quad (98)$$

$$Edd = rkss \cdot \exp(j \cdot \theta ss) \cdot \omega 0 \cdot b1 \cdot \exp\{j \cdot (\pi/2 + \theta 1)\} \quad (99)$$

When the expressions: $\theta v = \theta ss + \Delta \theta v$; and $2 \cdot rkv = \gamma v \cdot rkss$ are substituted into Equation (98), the electromotive force sum Esd is expressed by the following equation.

$$Esd = rksd \cdot \exp(j \cdot \theta sd) \cdot \omega 0 \cdot b1 \cdot \exp\{j \cdot (\pi/2 + \theta 1)\} + \gamma v \cdot rkss \cdot V \cdot b1 \cdot \exp\{j \cdot (\theta 1 + \theta ss + \Delta \theta v)\} \quad (100)$$

The electromotive force difference Edd in Equation (99) irrelevant to a flow velocity V only includes the components generated by ∂A/∂t. Using the electromotive force difference Edd enables measurements of parameters such as states of a fluid and states in a measuring pipe, other than flow velocity. When a variation factor due to a parameter is Cp4 and the value of the parameter is set to p4, the variation factor Cp4 is expressed by the following equation according to Equation (40).

$$Cp4 = rkc[p4] \cdot \exp(j \cdot \theta c[p4]) \quad (101)$$

The variation factor Cp4 in Equation (99) is rewritten by the following equation.

$$Cp4 = rkss \cdot b1 \cdot \exp\{j \cdot (\theta1 + \theta ss)\} \quad (102)$$
$$= Edd / \{\omega 0 \cdot \exp(j \cdot \pi/2)\}$$

Based on Equation (102), a value rkc[p4] and angle θc[p4] of the variation factor Cp4 with respect to the real axis are expressed by the following equations.

$$rkc[p4] = |Edd|/\omega 0 \quad (103)$$

$$\theta c[p4] = \angle Edd - (\pi/2) \quad (104)$$

Based on the relationship between the parameter p4 and the value rkc[p4] or between the parameter p4 and the angle θc[p4] that is already confirmed by measurement at calibration, a parameter p4 can be obtained.

The table 4 below shows the correspondence between the constants and variables in the above-described basic principle and those in the present embodiment. As apparent from Table 4, the present embodiment is one specific example of the above basic principle.

TABLE 4

Correspondence Between Basic Principle and Fourth Embodiment

| Constants and Variables of Basic Principle | Constants and Variables of Fourth Embodiment |
|---|---|
| rα | 1 |
| rβ | γv |
| θα | π/2 |
| θβ | Δθv |
| C | rkss · b1 · exp{j(θ1 + θss)} |

Next, specific operations of the state detection device of the present embodiment are described. As in the first embodiment, the power source 9 supplies excitation current I1 having a sine wave component at an angular frequency ω0 to the exciting coil 3.

Figure 22:
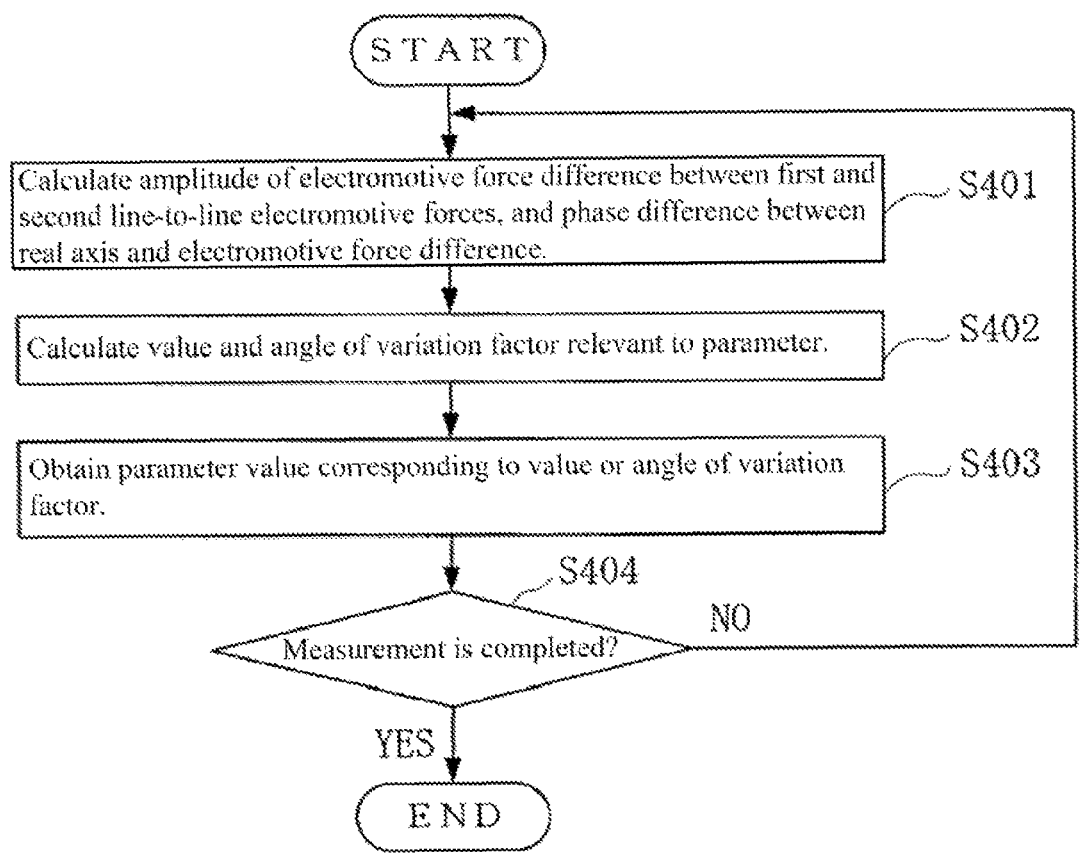
FIG. 22 is a flowchart illustrating operations of a state quantifying unit of the fourth embodiment according to the present invention.

FIG. 22 is a flowchart illustrating operations of the state quantifying unit 8c. First, in step S401 in FIG. 22, the signal converting unit 5c calculates an amplitude rdd of an electromotive force difference Edd between a first line-to-line electromotive force difference E1d0 and a second line-to-line electromotive force difference E2d0, and a phase difference φdd between the real axis and the electromotive force difference Edd by a phase detector.

In step S302, the signal converting unit 5c calculates a value and angle of the variation factor Cp4 relevant to a parameter p4, from the electromotive force difference Edd. The signal converting unit 5c calculates a value rkc[p4] of the variation factor Cp4 as follows.

$$rkc[p4] = rdd/\omega 0 \quad (105)$$

Then, the signal converting unit 5c calculates an angle θc[p4] of the variation factor Cp4 as follows.

$$\theta c[p4] = \phi dd - (\pi/2) \quad (106)$$

Here, the process in step S402 ends.

The state storing unit 6c has, in advance, the relationship between the parameter p4 and the value rkc[p4] of the variation factor Cp4, or between the parameter p4 and the angle θc[p4] of the variation factor Cp4 stored therein in the form of an equation or a table. In step S403, the state outputting unit 7c calculates (or obtains from the state storing unit 6a) the value of the parameter p4 corresponding to rkc[p4] or θc[p4], with reference to the state storing unit 6c, based on the value rkc[p4] or the angle θc[p4] of variation factor Cp4 obtained at the signal converting unit 5c.

The state quantifying unit 8c performs the above process from steps S401 to S403 at a constant frequency until an instruction to finish measurement is given by an operator for example in step S404 (YES in step S404).

As described above, in the present embodiment, the electromotive force difference Edd between the first line-to-line electromotive force difference E1d0 and the second line-to-line electromotive force difference E2d0 is extracted as a ∂A/∂t component, and a value of phase (angle) of the variation factor Cp4 relevant to a parameter p4 such as a property or state of fluid, a state of magnetic field, or a state in a measuring pipe is extracted from the electromotive force difference Edd, so as to obtain the parameter p4 based on the value or phase of the variation factor Cp4. Accordingly, independently of a flow velocity of a fluid, accurate detection of a property or state of the fluid, a state of a magnetic field, or a state in a measuring pipe is achieved. In the present embodiment, detection of states in a measuring pipe containing magnetic field and fluid can be achieved using the measuring pipe 1, the electrodes 2a and 2b, and the exciting coil 3 that are members of a detector of a conventional typical electromagnetic flowmeter, and arranging first signal lines 4a and 4b and second signal lines 4c and 4d in the opposite direction to that of the first signal lines 4a and 4b from the plane PLN where the electrodes 2a and 2b lie. As a result, the effect that has been obtained only by a state detection device using asymmetrical excitation in Japanese Patent Application Publication No. 2006-90794 can be realized by a typical electromagnetic flowmeter without significant change in its structure.

In the present embodiment, either a value rkc[p4] or angle θc[p4] of a variation factor Cp4 is extracted from the electromotive force difference Edd, but both of the value and angle may be extracted to obtain a parameter p4. In this case, the more sensitive of the value rkc[p4] or the angle θc[p4] is selected, and the parameter p4 is obtained based on the selected value or angle, for example. This enhances detection sensitivity.

In the present embodiment, the electromotive force sum Esd is substantially equal to a v×B component. The calculation of a flow rate of fluid using a v×B component is known in the technology of typical electromagnetic flowmeter, and is easily implemented in a computer in the state quantifying unit 8a. Accordingly, the present embodiment is operable as a flowmeter.

Fifth Embodiment

Figure 23:
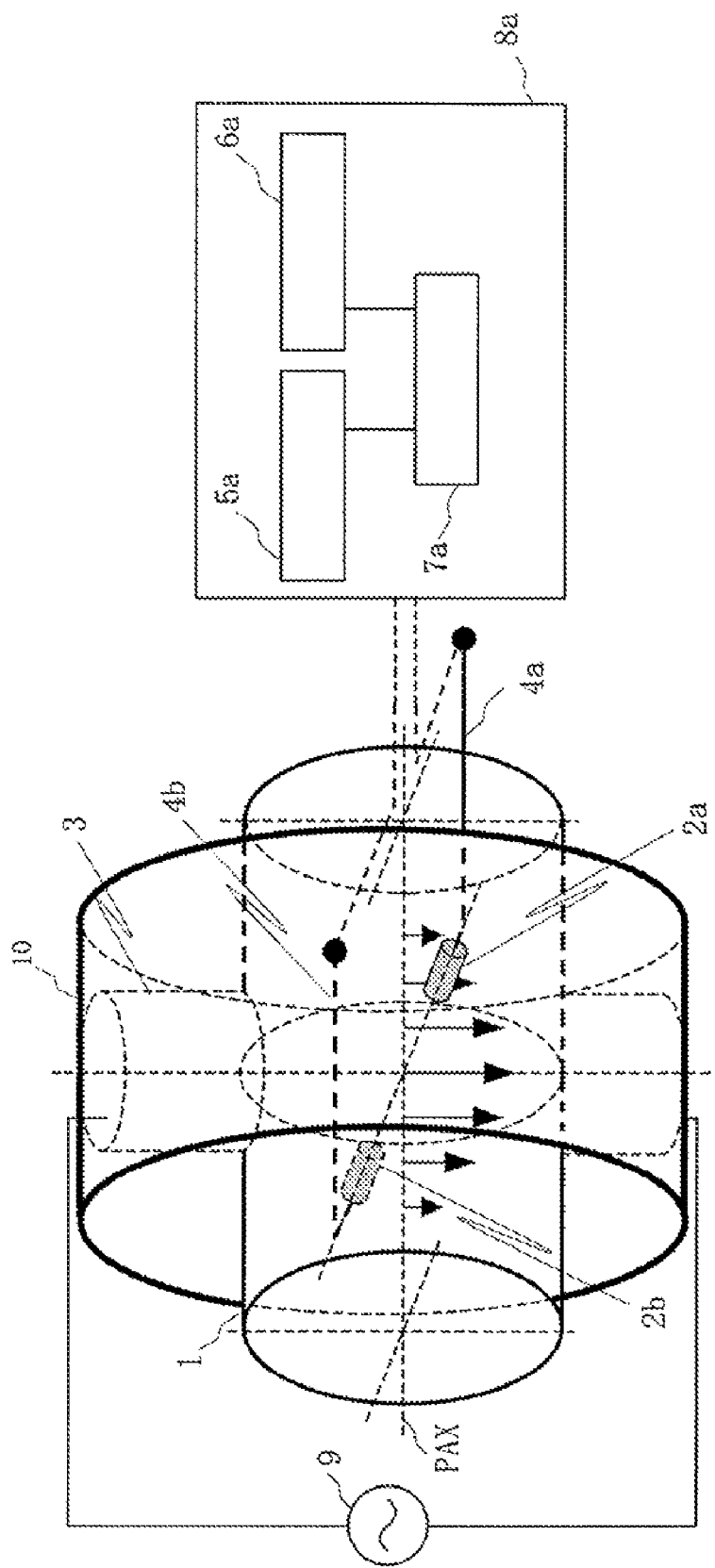
FIG. 23 is block diagram illustrating the configuration of a state detection device of a fifth embodiment according to the present invention.

Next, a fifth embodiment of the present invention is described. A typical electromagnetic flowmeter is usually covered with a magnetic member that is called outer core to efficiently reflect magnetism to an exciting coil where the magnetism is generated. In the first to fourth embodiments, the signal lines 4a, 4b, 4c, and 4d are arranged inside of the outer core to efficiently detect a ∂A/∂t component. This arrangement is useful to every embodiment, and FIG. 23 illustrates one example of the arrangement applied to the first or second embodiment. In FIG. 23, the signal lines 4a and 4b are arranged inside of an outer core 10.

The first embodiment to fifth embodiments use sine wave excitation current, but may use square wave excitation current. In the case of square wave excitation current, however, the excitation of high frequency waves is difficult, and thereby using square wave is disadvantageous in responsivity to a change in flow rate and interference due to 1/f noise, as compared to the case using sine wave excitation.

In the first embodiment to fifth embodiments, the axis of the exciting coil 3, the pipe axis PAX, and the electrode axis EAXa lie in the mutually perpendicular directions and cross at one point, but may be otherwise arranged. In the first and second embodiments and fourth embodiment, the axis of the exciting coil 3 may be offset to the electrode 2a or the electrode 2b.

Figure 24:
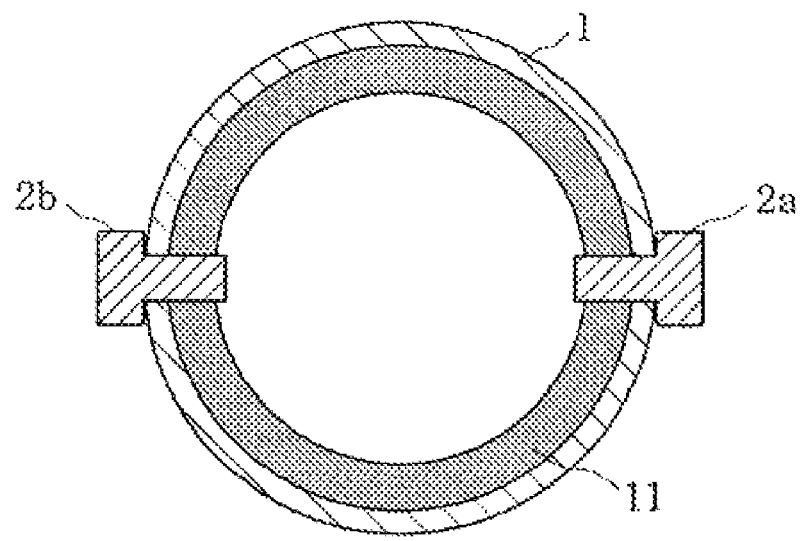
FIG. 24 is a cross sectional view illustrating an electrode used in a state detection device of the first to fifth embodiments according to the present invention.
Figure 25:
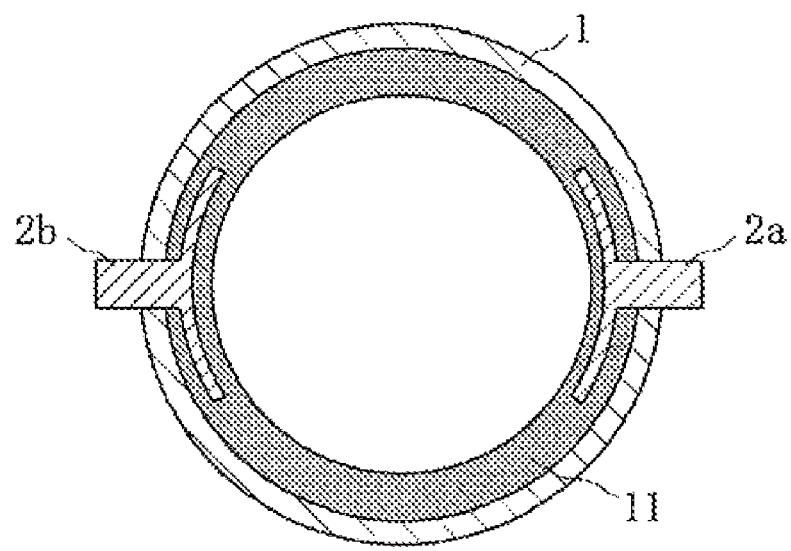
FIG. 25 is a cross sectional view illustrating another electrode used in a state detection device of the first to fifth embodiments according to the present invention.

The electrodes 2a and 2b in the first embodiment to fifth embodiments may be those that are exposed to a measured fluid through the inner wall of the measuring pipe 1 as illustrated in FIG. 24, or capacitively-coupled electrodes that are not in contact to a measured fluid as illustrated in FIG. 25. In the latter case, the electrodes 2a and 2b are covered with a lining 11 that is formed of ceramic or Teflon® at the inner wall of the measuring pipe 1.

The first and second embodiments and fourth embodiment use a pair of electrodes 2a and 2b, but may use a single electrode. The third embodiment, however, needs two electrodes. In the case with a single electrode, a ground ring or ground electrode is provided to the measuring pipe 1 to ground potential of a measured fluid, and the electromotive force (the difference from ground potential) generated between the electrode and a signal line connected to the electrode can be detected by the signal converting unit 5a, 5b, or 5c.

In the first embodiment, when one electrode 2a and one signal line 4a are used, the signal converting unit 5a detects an electromotive force Ei0 generated at the electrode 2a and the signal line 4a instead of a line-to-line electromotive force difference. Similarly, in the second embodiment, the signal converting unit 5a detects electromotive forces generated at the electrode 2a and the signal line 4a Ed0 and Ed1 instead of a line-to-line electromotive force difference. In the fourth embodiment, when one electrode 2a and signal lines 4a and 4c are used, the signal converting unit 5c detects a first electromotive force E1d0 generated at the electrode 2a and the signal line 4a instead of a first line-to-line electromotive force difference, and the signal converting unit 5c detects a second electromotive force E2d0 generated at the electrode 2a and the signal line 4c instead of a second line-to-line electromotive force difference.

The axis of electrode is, when a pair of electrodes are used, a straight line extending between the electrodes. In the case with a single electrode, a straight line between the electrode and an imaginary electrode serves as the axis, by assuming that the imaginary electrode lies at the one end of the plane PLN where the real electrode lies at the opposite end thereof across the pipe axis PAX.

Figure 26:
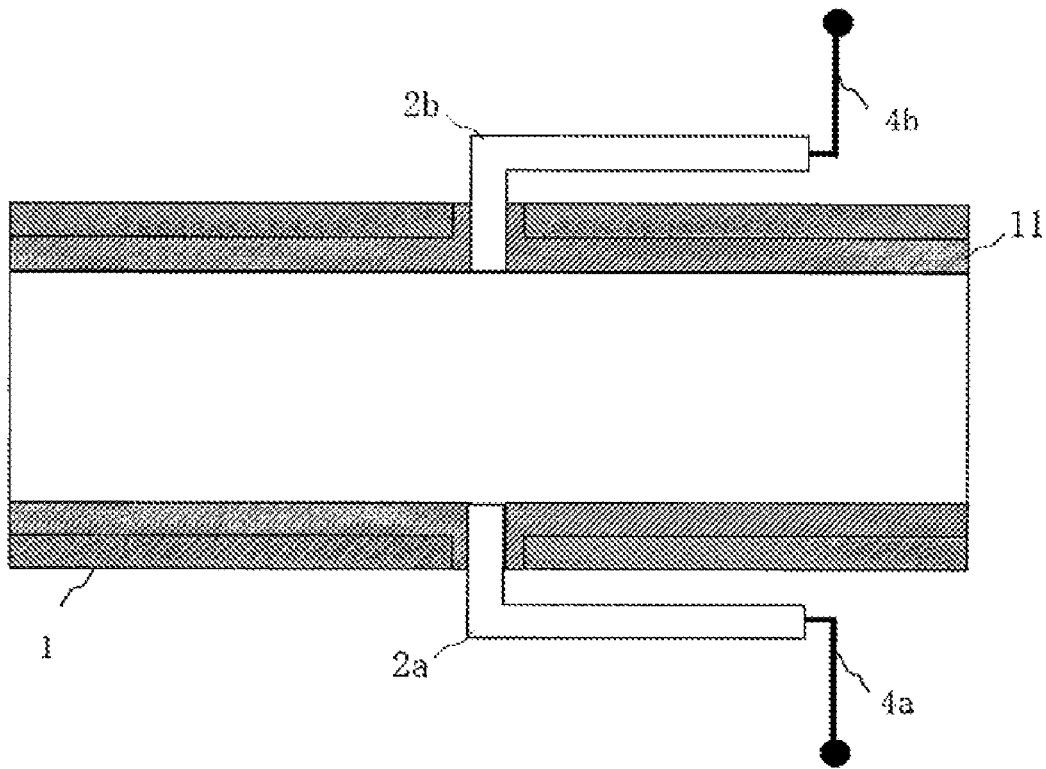
FIG. 26 is a cross sectional view illustrating another electrode used in a state detection device of the first to fifth embodiments according to the present invention.

Apparently, when the electrodes 2a and 2b in the first to fifth embodiments have a shape that has a portion lying in the direction of the pipe axis as illustrated in FIG. 26, the same effect as in the case with the signal lines 4a, 4b, 4c, and 4d can be obtained.

Figure 27:
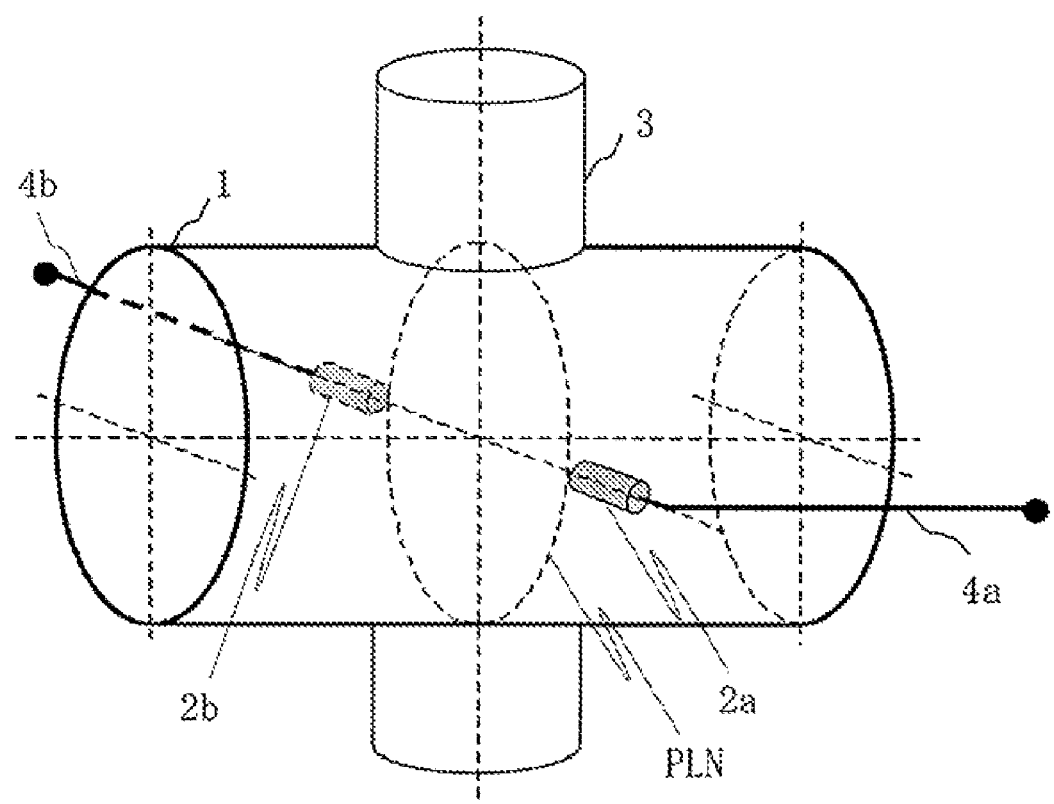
FIG. 27 illustrates another arrangement of signal lines of the first to fifth embodiments according to the present invention.
Figure 28:
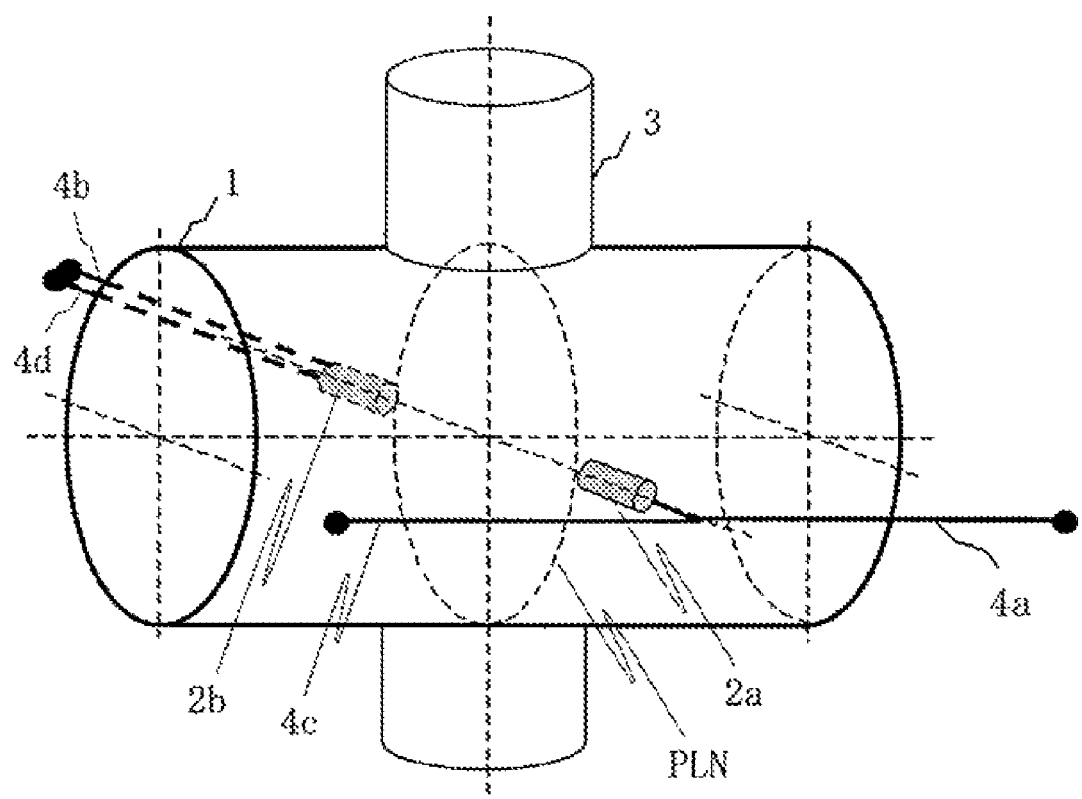
FIG. 28 illustrates another arrangement of signal lines of the fourth embodiment according to the present invention.
Figure 29:
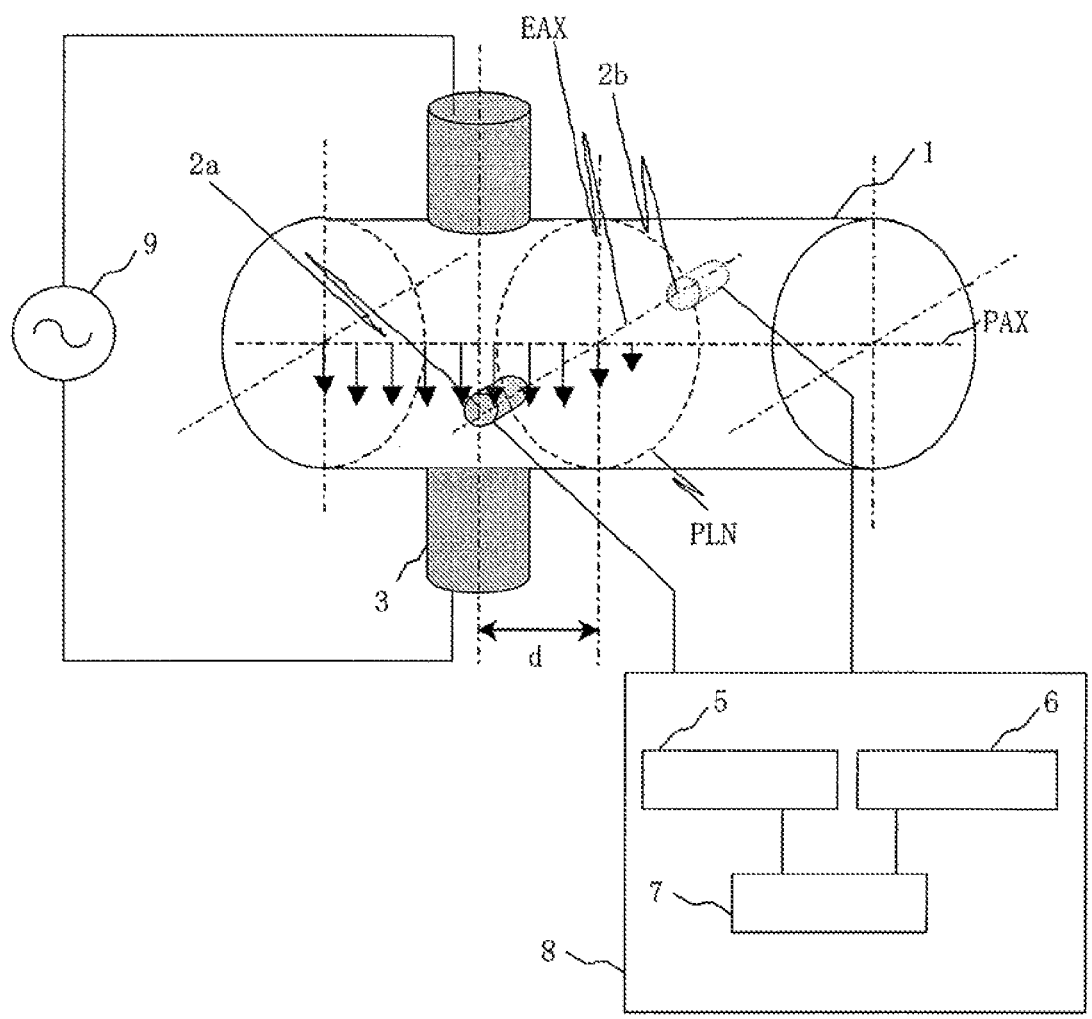
FIG. 29 is block diagram illustrating the configuration of a conventional state detection device.

In the first and second embodiments, as illustrated in FIG. 27, the signal lines 4a and 4b connected to the electrodes 2a and 2b respectively may be arranged such that the signal line 4a lies at an angle relative to the direction of the magnetic field that is parallel to the plane PLN to generate an electromotive force due to a change with passage of time in the magnetic field, whereas the signal line 4b has a minimum area that interlinks with the magnetic flux from the exciting coil 3 as in a typical electromagnetic flowmeter not to generate an electromotive force due to a change with passage of time in the magnetic field. Similarly, in the fourth embodiment, as illustrated in FIG. 28, the signal lines 4a and 4b, 4c, 4d connected to the electrodes 2a and 2b may be arranged such that the signal lines 4a and 4c connected to the electrode 2a lie at an angle relative to the direction of the magnetic field that is parallel to the plane PLN to generate an electromotive force due to a change with passage of time in the magnetic field, whereas the signal lines 4b and 4d have a minimum area that interlinks with the magnetic flux from the exciting coil 3 as in a typical electromagnetic flowmeter not to generate an electromotive force due to a change with passage of time in the magnetic field. In the case illustrated in FIG. 28, the signal lines 4b and 4d may be combined into one line.

The above-described various arrangements of signal lines are not necessarily applied to the entire paths between the electrodes 2a and 2b and the signal converting unit 5a, 5b, or 5c. In other words, the signal lines need to be arranged as described above from the electrodes 2a and 2b to the middle points to the converter, and may be arranged in any manner such that the affect of change in magnetic field is minimized from the middle points to the signal converting unit 5a, 5b, or 5c, such as arranging the signal lines at positions with minimal affect of a change in magnetic field, and shielding the signal lines.

In the first embodiment to fifth embodiments, the state quantifying units 8a, 8b, and 8c except the unit that detects electromotive forces are achieved by a CPU, a memory, and a computer with interface, and programs that control the hardware sources. The CPU executes the above-described processes according to the programs stored in the memory.

INDUSTRIAL APPLICABILITY

The present invention is applicable to a state detection device that detects a property or state of a fluid, a state of a magnetic field, or states in a measuring pipe.

The preceding description has been presented only to illustrate and describe exemplary embodiments of the present state detection device. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A state detection device that detects a parameter such as a property or state of a fluid, a state of a magnetic field, or a state in a measuring pipe, comprising:
a measuring pipe through which a fluid flows;
at least one electrode in the measuring pipe that detects an electromotive force generated by a magnetic field applied to the fluid and flow of the fluid;
an exciting unit including the electrode that applies a time-changing magnetic field symmetrical to an axial plane of the electrode that is perpendicular to an axis of the measuring pipe;
at least one signal line that is connected to the electrode at one end thereof at an angle to the magnetic field that is parallel to the axial plane of the electrode, such that an electromotive force is generated by a change with passage of time in the magnetic field; and
a state quantifying unit that is connected to the other end of the signal line to extract a ∂A/∂t component from resultant electromotive forces that are detected at the electrode and the signal line and are composed of an electromotive force of the ∂A/∂t component irrelevant to a flow velocity of the fluid and resulting from a change with passage of time in the magnetic field and an electromotive force of a v×B component relevant to the flow velocity of the fluid, and extracts a variation factor relevant to the parameter from the ∂A/∂t component to quantify the parameter based on the variation factor.

2. The state detection device according to claim 1, wherein the state quantifying unit includes: a signal converting unit that extracts the ∂A/∂t component from resultant electromotive forces that are detected at the electrode and the signal line and are composed of an electromotive force of the ∂A/∂t component irrelevant to a flow velocity of the fluid and resulting from a change with passage of time in the magnetic field and an electromotive force of a v×B component relevant to the flow velocity of the fluid, and extracts a variation factor relevant to the parameter from the ∂A/∂t component; a state storing unit that stores, in advance, the relationship between the variation factor relevant to the parameter and the parameter; and a state outputting unit that outputs the parameter corresponding to the extracted variation factor, based on the relationship stored in the state storing unit.

3. The state detection device according to claim 2, wherein the signal line has a portion extending in the same direction as the axial direction of the measuring pipe.

4. The state detection device according to claim 2 or 3, wherein the exciting unit includes: an exciting coil having an axis lying in the axial plane of the electrode; and a power source supplying an excitation current to the exciting coil, and the signal converting unit extracts the ∂A/∂t component based on a phase difference or time difference between the resultant electromotive forces and the excitation current.

5. The state detection device according to claim 4, wherein the power source supplies an excitation current of a first frequency to the exciting coil, the signal converting unit extracts the ∂A/∂t component based on a phase difference between a component of the first frequency in the resultant electromotive forces and the excitation current, and extracts a value or phase of a variation factor relevant to the parameter from the ∂A/∂t component, and the state storing unit stores in advance the relationship between the value or phase of the variation factor relevant to the parameter and the parameter.

6. The state detection device according to claim 2 or 3, wherein the exciting unit includes: an exciting coil having an axis lying in the axial plane of the electrode; and a power source supplying excitation currents to the exciting coil, the currents yielding a plurality of exciting frequencies simultaneously or alternatively, and the signal converting unit extracts the ∂A/∂t component based on amplitudes and phases of at least two frequency components that are obtained simultaneously or alternatively from the resultant electromotive forces.

7. The state detection device according to claim 6, wherein the power source supplies excitation currents to the exciting coil, the currents yielding first and second exciting frequencies simultaneously or alternatively, the signal converting unit obtains amplitudes and phases of two components at the first and second frequencies from the resultant electromotive forces, extracts the electromotive force difference between the first and second frequency components as the ∂A/∂t component to extract a value or phase of a variation factor relevant to the parameter from the ∂A/∂t component, and the state storing unit stores in advance the relationship between the value or phase of the variation factor relevant to the parameter and the parameter.

8. The state detection device according to claim 2 to 3, wherein the at least one electrode comprises a pair of electrodes disposed opposite to each other across the axis of the measuring pipe and along an axis perpendicular to the axis of the measuring pipe, and the at least one signal line comprises two signal lines connected to the electrodes respectively, at least one of the two signal lines being arranged at an angle to a magnetic field that is parallel to the axial plane of the electrodes such that a change with passage of time in the magnetic field generates an electromotive force.

9. The state detection device according to claim 2 or 3, wherein the exciting unit includes: an exciting coil having an axis lying in the axial plane of the electrode; and a power source supplying an excitation current to the exciting coil, the at least one signal line comprises a plurality of signal lines arranged in different directions from one another, and the signal converting unit extracts the ∂A/∂t component based on the sum or difference between the resultant electromotive forces obtained from the plurality of signal lines.

10. The state detection device according to claim 9, wherein the at least one electrode comprises a pair of electrodes disposed opposite to each other across the axis of the measuring pipe and along an axis perpendicular to the axis of the measuring pipe, the at least one signal line comprises two signal lines that are connected to the electrodes respectively and disposed in the opposite directions from each other from the axial plane of the electrodes, the signal converting unit extracts the ∂A/∂t component based on the sum of the resultant electromotive forces obtained from the two signal lines, and extracts a value or phase of a variation factor relevant to the parameter from the ∂A/∂t component, and the state storing unit stores in advance the relationship between the value or phase of the variation factor relevant to the parameter and the parameter.

11. The state detection device according to claim 9, wherein the at least one signal line comprises a plurality of signal lines connected to the same electrode, the signal converting unit extracts the ∂A/∂t component based on an amplitude and phase of the resultant electromotive force obtained from the at least two signal lines among the resultant electromotive forces obtained from the plurality of signal lines.

12. The state detection device according to claim 11, wherein the at least one signal line comprises first and second signal lines connected to the same electrode and disposed in the opposite directions from each other from the axial plane of the electrode, the signal converting unit calculates an amplitude and a phase of a first resultant electromotive force obtained from the first signal line and an amplitude and a phase of a second resultant electromotive force obtained from the second signal line and extracts an electromotive force difference between the first and second resultant electromotive forces as the ∂A/∂t component based on the amplitudes and phases to extract a value or phase of a variation factor relevant to the parameter from the ∂A/∂t component, and the state storing unit stores in advance the relationship between the value or phase of the variation factor relevant to the parameter and the parameter.

13. The state detection device according to claim 11, wherein the at least one electrode comprises a pair of electrodes disposed opposite to each other across the axis of the measuring pipe and along an axis perpendicular to the axis of the measuring pipe, and the at least one signal line comprises a plurality of signal lines connected to each of the electrodes, the signal lines connected to at least one of the electrodes being arranged at an angle to a magnetic field that is parallel to the axial plane of the electrodes such that a change with passage of time in the magnetic field generates an electromotive force.

14. The state detection device according to any one of claim 1, further comprising an outer core that covers the exciting unit, and the at least one signal line is arranged inside of the outer core at an angle to a magnetic field that is parallel to the axial plane of the at least one electrode such that a change with passage of time in the magnetic field generates an electromotive force.

15. The state detection device according to any one of claim 4, further comprising an outer core that covers the exciting coil, and the at least one signal line is arranged inside of the outer core at an angle to a magnetic field that is parallel to the axial plane of the at least one electrode such that a change with passage of time in the magnetic field generates an electromotive force.

* * * * *